(12) United States Patent
Olander et al.

(10) Patent No.: US 11,140,830 B2
(45) Date of Patent: Oct. 12, 2021

(54) HIGH CAPACITY BALER WITH MULTIPLE KNOTTERS

(71) Applicant: Great Plains Manufacturing, Inc., Salina, KS (US)

(72) Inventors: Brian Olander, Salina, KS (US); Taylor Bozarth, Hesston, KS (US)

(73) Assignee: Great Plains Manufacturing, Inc., Salina, KS (US)

( * ) Notice: Subject to any disclaimer, the term of this patent is extended or adjusted under 35 U.S.C. 154(b) by 137 days.

(21) Appl. No.: 16/446,093

(22) Filed: Jun. 19, 2019

(65) Prior Publication Data

US 2020/0214221 A1 Jul. 9, 2020

Related U.S. Application Data

(60) Provisional application No. 62/801,982, filed on Feb. 6, 2019, provisional application No. 62/790,249, filed on Jan. 9, 2019.

(51) Int. Cl.
*A01F 15/04* (2006.01)
*A01F 15/10* (2006.01)
(Continued)

(52) U.S. Cl.
CPC .......... *A01F 15/046* (2013.01); *A01D 85/005* (2013.01); *A01D 89/002* (2013.01);
(Continued)

(58) Field of Classification Search
CPC ........ A01F 15/046; A01F 15/02; A01F 15/04; A01F 15/08; A01F 15/0825;
(Continued)

(56) References Cited

U.S. PATENT DOCUMENTS 3,020,830 A * 2/1962 Harrington ............. A01F 15/04
100/209
4,651,512 A * 3/1987 van der Lely ...... A01F 15/0705
100/88
(Continued)

FOREIGN PATENT DOCUMENTS

EP 0429798 A1 10/1990
EP 1562739 B1 7/2015

OTHER PUBLICATIONS

Lynn Jaynes, Editor, Progressive Publishing Two new machines rolling into hay fields, Double Baler, https://www.progressiveforage.com/forage-production/equipment/two-new-machines-rolling-into-hay-fields, Published Oct. 31, 2018, 6 pages.
(Continued)

*Primary Examiner* — Teresa M Ekiert
*Assistant Examiner* — Teresa A Guthrie
(74) *Attorney, Agent, or Firm* — Hovey Williams LLP; Kameron D. Kelly

(57) ABSTRACT

A high capacity square baler comprising a pickup mechanism configured to pick up a single windrow of crop material off the ground. The baler additionally comprising one or more stuffer chutes each configured to receive at least a portion of the crop material picked up by the pickup mechanism. The baler additionally comprising one or more stuffer assemblies each configured to push crop material generally upward through one or more of the stuffer chutes. The baler additionally comprising a plurality of bale-forming chambers each configured to receive crop material from one or more of the stuffer chutes. The baler further comprising a plurality of knotter assemblies each associated with one of the bales forming chambers and each configured to wrap and tie securement lines around each formed bale. The knotter
(Continued)

assemblies are configured to operate independently of one another, such that formed bales can be tied at different times.

19 Claims, 13 Drawing Sheets

(51) Int. Cl.
```
A01F 15/14      (2006.01)
A01F 15/08      (2006.01)
A01F 15/16      (2006.01)
B60K 35/00      (2006.01)
G01B 5/02       (2006.01)
A01D 89/00      (2006.01)
A01F 15/02      (2006.01)
A01D 85/00      (2006.01)
B30B 9/30       (2006.01)
```
(52) U.S. Cl.
CPC ........... *A01F 15/02* (2013.01); *A01F 15/04* (2013.01); *A01F 15/044* (2013.01); *A01F 15/08* (2013.01); *A01F 15/0825* (2013.01); *A01F 15/0841* (2013.01); *A01F 15/0875* (2013.01); *A01F 15/10* (2013.01); *A01F 15/101* (2013.01); *A01F 15/14* (2013.01); *A01F 15/145* (2013.01); *A01F 15/16* (2013.01); *B30B 9/30* (2013.01); *B30B 9/3014* (2013.01); *B60K 35/00* (2013.01); *G01B 5/02* (2013.01); *A01D 2085/007* (2013.01); *A01D 2085/008* (2013.01); *A01F 15/042* (2013.01); *A01F 2015/102* (2013.01)

(58) Field of Classification Search
CPC ........... A01F 15/0841; A01F 15/0875; A01F 15/0858; A01F 15/10; A01F 15/101; A01F 15/14; A01F 15/145; A01F 15/16; A01F 15/042; A01F 2015/0866; A01F 2015/102; A01D 85/005; A01D 89/002; A01D 2085/007; A01D 2085/008; B30B 9/3014; B60K 35/00; G01B 5/02
USPC ................... 100/142, 33 R, 19 R; 289/2, 16
See application file for complete search history.

(56) References Cited

U.S. PATENT DOCUMENTS

| | | | |
|---|---|---|---|
| 5,156,085 A | 10/1992 | Bossche | |
| 5,735,199 A | 4/1998 | Esau et al. | |
| 5,761,994 A | 6/1998 | Itakura | |
| 6,134,870 A | 10/2000 | Lippens et al. | |
| 6,182,563 B1 | 2/2001 | Brown, Jr. | |
| 6,385,952 B1 | 5/2002 | Bergkamp et al. | |
| 6,397,738 B1 | 6/2002 | Brown, Jr. | |
| 6,421,992 B1* | 7/2002 | Goering | A01D 46/08 56/16.4 B |
| 7,275,904 B2 | 10/2007 | Kuhns | |
| 7,478,591 B2 | 1/2009 | Kendrick et al. | |
| 7,610,851 B1 | 11/2009 | Horst | |
| 7,703,391 B2 | 4/2010 | Duenwald et al. | |
| 7,975,607 B2 | 7/2011 | Hoover et al. | |
| 8,113,110 B2* | 2/2012 | Kraus | A01F 15/101 100/35 |
| 8,122,822 B1 | 2/2012 | Horst | |
| 8,333,100 B2 | 12/2012 | Takeshita | |
| 9,107,347 B2* | 8/2015 | Esau | A01F 15/0858 |
| 9,204,596 B2 | 12/2015 | Van De Laarschot et al. | |
| 9,359,154 B2 | 6/2016 | Grady | |
| 10,064,339 B2 | 9/2018 | Schrag et al. | |
| 2003/0029330 A1 | 2/2003 | Chassiboud | |
| 2006/0054033 A1 | 3/2006 | Roth | |
| 2010/0242747 A1 | 9/2010 | Kraus | |
| 2016/0290798 A1* | 10/2016 | Verhaeghe | A01F 15/042 |
| 2018/0077872 A1* | 3/2018 | Maelfeyt | A01D 59/06 |
| 2020/0000041 A1 | 1/2020 | Grady | |

OTHER PUBLICATIONS

Lynn Jaynes Forage Editor, Progressive Publishing, Video: Double baler—they said it wouldn't work, https://www.progressiveforage.com/forage-production/equipment/video-double-baler-they-said-it-wouldn-t-work, Published Dec. 3, 2018, 4 pages.

YouTube video, Forage Equipment Innovations: Twin Pak double baler, Nov. 28, 2018, https://www.youtube.com/watch?v=0AMjgIDp-n0, 3 pages.

Carl C. Stafford, Progressive Publishing, The Mt. Pony Special—Double-barrel baler, Feb. 27, 2014, https://www.progressiveforage.com/forage-production/equipment/the-mt-pony-special-double-barrel-baler, 5 pages.

Search Report and Written Opinion dated Jul. 2, 2020 for related PCT Application No. PCT/US2020/012715, 18 pages.

Two New Holland Balers Merged Into One Big Machine, Farm Show Magazine: 2014—vol. 38, Issue 3, p. 30, Feb. 10, 2021, 2 pages.

JM-AG Services LLC, Worlds One and Only Double Baler, Jun. 18, 2018, Facebook, https://www.facebook.com/858675364214317/videos/1712718512143327/?redirect=falst (Year: 2018).

Office Action dated Feb. 22, 2021 for related U.S. Appl. No. 16/564,001, 28 pages.

\* cited by examiner

HIGH CAPACITY BALER WITH MULTIPLE KNOTTERS

CROSS-REFERENCE TO RELATED APPLICATIONS

The present non-provisional patent application claims priority to U.S. Provisional Patent Application Ser. No. 62/801,982, filed on Feb. 6, 2019, and entitled "HIGH CAPACITY SQUARE BALER," and to U.S. Provisional Patent Application Ser. No. 62/790,249, filed on Jan. 9, 2019, and entitled "HIGH CAPACITY SQUARE BALER," with the entireties of both above-identified, previously-filed provisional applications being hereby incorporated by reference into the present non-provisional patent application.

FIELD OF THE INVENTION

Embodiments of the present invention are generally directed to high capacity balers. More particularly, embodiments of the present invention are directed to balers that include components, such as a plurality of knotter assemblies, for simultaneously forming multiple bales of crop material.

BACKGROUND OF THE INVENTION

Balers are agricultural implements that form bales (e.g., square or round-shaped bales) of crop material. Most currently available square balers use a single baling chamber with a single gearbox, a single plunger, and a single knotter assembly to produce one square bale at a time. To increase baling efficiency, there is a desire to increase the capacity of some balers to produce more bales per hour. One way to increase baler capacity is to run the baler's plunger faster; however, due to concerns with knotter assembly reliability at high speeds, plunger speeds have maxed out at approximately one hundred revolutions per minute. Another option to increase baler capacity is to use thicker flakes when forming the bales; however, end users of bales often object to bale flakes being too large. Also, larger flakes can lead to inconsistent bale lengths.

These limitations have led to special hitches that pull two balers with one tow vehicle. While this solution can increase bale production, the use of two balers negatively impacts maneuverability of the tow vehicle and/or of the balers during both field operation and transport.

SUMMARY OF THE INVENTION

In one embodiment of the present invention, there is provided a high capacity square baler comprising a pickup mechanism configured to pick up a single windrow of crop material off the ground. The baler additionally comprising one or more stuffer chutes each configured to receive at least a portion of the crop material picked up by the pickup mechanism. The baler additionally comprising one or more stuffer assemblies, each configured to push crop material generally upward through one or more of the stuffer chutes. The baler additionally comprising a plurality of bale-forming chambers, each configured to receive crop material from one or more of the stuffer chutes. The baler further comprising a plurality of knotter assemblies, each associated with one of the bales forming chambers and each configured to wrap and tie at least two securement lines around each formed bale. Each of the knotter assemblies includes a trip mechanism configured to initiate tying of the securement lines around each bale upon completion of bale formation. The knotter assemblies are configured to operate independently of one another, such that formed bales can be tied at different times.

In another embodiment of the present invention, there is provided a method of forming a plurality of bales of crop material with a high capacity square baler. The method comprises a step of picking up crop material from a single windrow. The method comprises an additional step of providing the crop material to one or more stuffer chutes, with the stuffer chutes configured to pre-compress the crop material. The method comprises an additional step of transferring the crop material from the one or more stuffer chutes to a plurality of bale-forming chambers. The method comprises an additional step of forming bales of crop material within each of the bale-forming chambers. The method comprises a further step of tying at least two securement lines around each bale formed in each of the bale-forming chambers.

This summary is provided to introduce a selection of concepts in a simplified form that are further described below in the detailed description. This summary is not intended to identify key features or essential features of the claimed subject matter, nor is it intended to be used to limit the scope of the claimed subject matter. Other aspects and advantages of the present invention will be apparent from the following detailed description of the embodiments and the accompanying drawing figures.

BRIEF DESCRIPTION OF THE FIGURES

Embodiments of the present invention are described herein with reference to the following drawing figures, wherein.

Figure 1:
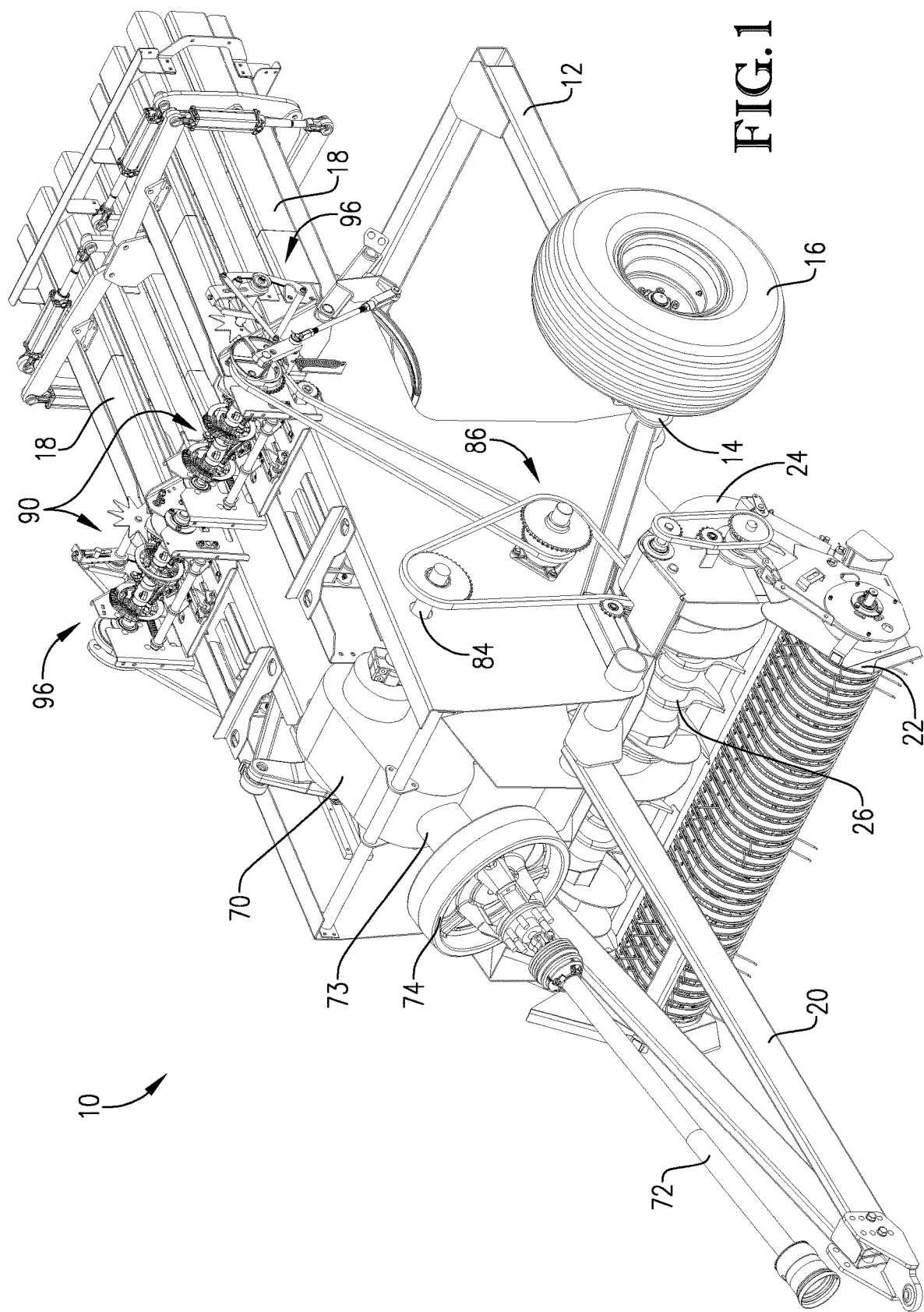
FIG. 1 is a front, left-side perspective view of a baler according to embodiments of the present invention.

The drawing figures do not limit the present invention to the specific embodiments disclosed and described herein. The drawings are not necessarily to scale, emphasis instead being placed upon clearly illustrating the principles of the invention.

DETAILED DESCRIPTION

The following detailed description of the present invention references various embodiments. The embodiments are intended to describe aspects of the invention in sufficient detail to enable those skilled in the art to practice the invention. Other embodiments can be utilized and changes can be made without departing from the scope of the present invention. The following detailed description is, therefore, not to be taken in a limiting sense. The scope of the present invention is defined only by the appended claims, along with the full scope of equivalents to which such claims are entitled.

Figure 2:
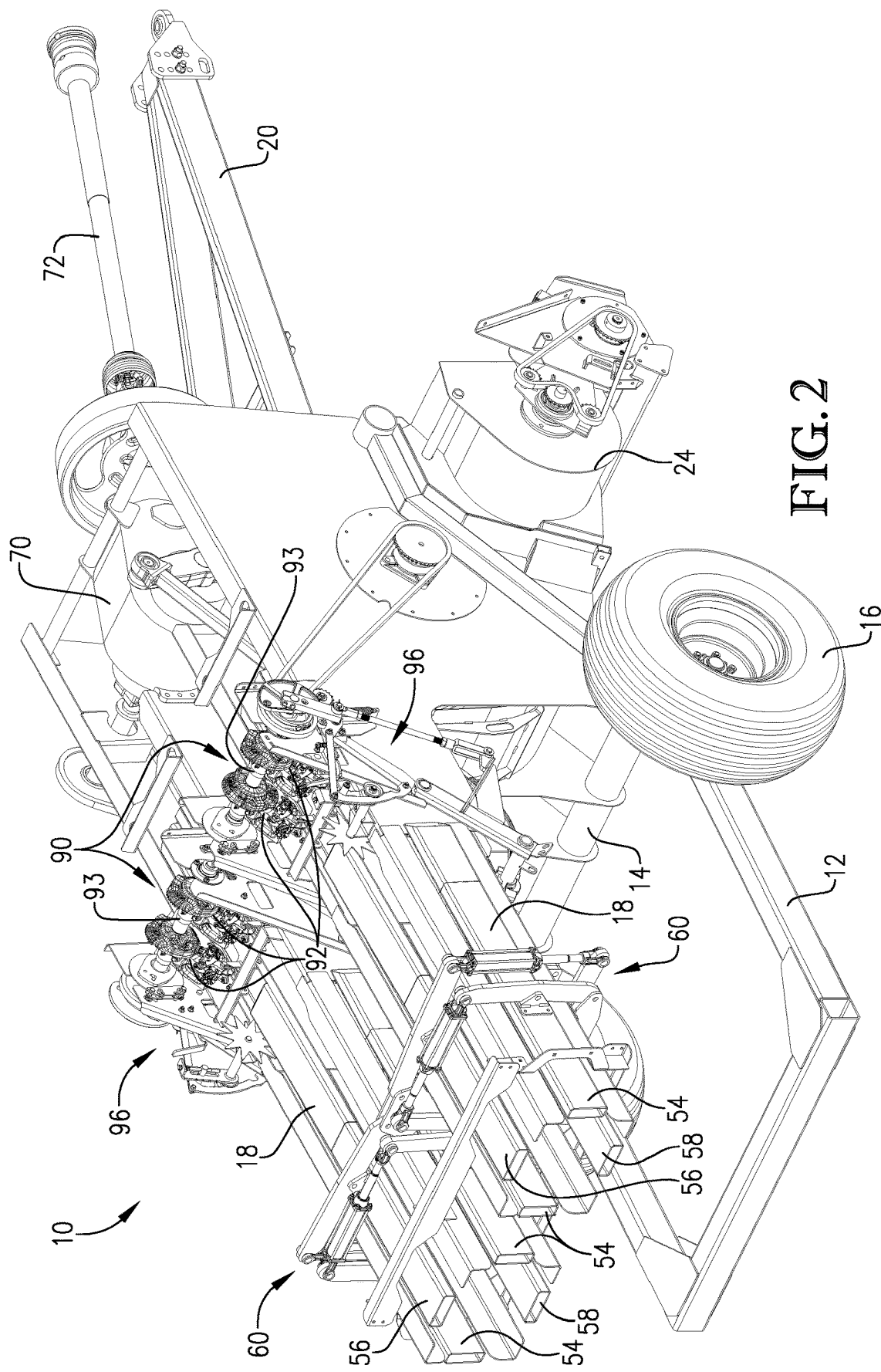
FIG. 2 is a rear, right-side perspective view of the baler from FIG. 1.

Broadly, embodiments of the present invention are directed to agricultural implements in the form of crop balers, such as baler 10 illustrated in FIGS. 1 and 2, which are configured to simultaneously form two or more bales of crop material from a single windrow of the crop material. In some embodiments, the baler 10 will be configured to form square bales of crop material, such that the baler 10 is a square baler.

The baler 10 may include a wheeled chassis 12 including an axle 14 and a pair of laterally spaced wheels 16 that support the chassis 12 above the ground. The baler 10 may additionally comprise a plurality of baling chambers 18, extending generally in a fore-and-aft direction and which are supported on top of the chassis 12. As will be described in more detail below, the baling chambers 18 are configured as bale-forming chambers in which small, square bales of crop material can be formed. Because the baler 10 includes a plurality of baling chambers 18, the baler 10 may be referred to as a "high capacity" baler capable of simultaneously forming multiple bales of crop material. In some specific embodiments, the baler 10 will include two baling chambers 18 supported on the chassis 12 and positioned between the wheels 16. As will be described in more detail below, the plurality of baling chambers 18 permits the baler 10 to simultaneously form a plurality of bales of crop material. In some embodiments, the plurality of bales of crop material may be formed by the baler 10 picking up crop material from a single windrow of crop material.

In some embodiments, the baler 10 may be pulled or pushed by a towing vehicle (e.g., a tractor, which is not shown in the drawings). In alternative embodiments, the baler 10 may be self-propelled. For example, the baler 10 may include an internal combustion engine and any other components necessary for the baler 10 to operate independently of any other machine or towing vehicle. Returning to embodiments in which the baler 10 is pulled by a towing vehicle, the chassis 12 of the baler 10 may include a forwardly-extending tongue 20, as illustrated in FIGS. 1 and 2, for connecting the baler 10 to the towing vehicle. A forward end of the tongue 20 may include a hitch for facilitating the connection with the towing vehicle, while a rearward end of the tongue 20 may be pivotally connected to the chassis 12. It will be appreciated that, as used herein, the terms "front" or "forward" refers to a direction towards a free end of the tongue 20 of the baler 10, while the terms "back," "rear," or "rearward" refer to an opposite direction (i.e., away from the free end of the tongue 20 of the baler 10). Correspondingly, the terms "left," "left-side," "right," and "right-side" should generally be interpreted as corresponding to the appropriate directions when viewing the front of the baler 10 while positioned at the back of the baler 10. As such, for example, the left-side of the baler 10 is shown in the foreground of FIG. 1, while the right-side of the baler is shown in the foreground of FIG. 2. The tongue 20 is generally configured to connect the baler 10 with the towing vehicle in a manner that allows the baler 10 to be positioned directly behind the towing vehicle. As such, the baler 10 can pick up crop material from a single windrow that is passed over first by the towing vehicle and then by the baler 10. As such, the baler 10 may, in some embodiments, be configured as an "in-line" baler, as will be discussed in more detail below.

To collect crop material laying on the ground in a windrow, the baler 10 may include a pickup mechanism 22, as perhaps best illustrated in FIGS. 1, 3, and 4, which is supported on the chassis 12 below the baling chambers 18. In some embodiments, the pickup mechanism 22 may extend down from the chassis 12 and may be positioned in front of the wheels 16. As such, the pickup mechanism 22 may be centered about a longitudinal centerline of the baler 10, so as to permit the pickup mechanism 22 to pick up crop material within a single windrow as the baler 10 is advanced along a path of travel by the towing vehicle (i.e., with the path of travel extending over the path presented by the windrow). To facilitate the collection of the crop material, the pickup mechanism 22 may comprise a tined, rotating member, which is configured to pick up the crop material of the windrow off the ground. Upon picking up the crop material, the pickup mechanism 22 will be further configured to transfer the crop material upward and rearward to a rotor housing 24 illustrated in FIGS. 1-5.

The rotor housing 24 may also be positioned below the baling chamber 18 and is generally configured to rotatably support a rotor 26 within the rotor housing 24. The rotor 26 is shown in more detail in FIG. 6. The rotor 26 may be configured to convey the crop material from the rotor housing 24, as illustrated in FIG. 4, rearward to one or more stuffer chutes 28. The stuffer chutes 28 are perhaps best illustrated in FIGS. 4, 7, and 8. In some embodiments, the baler 10 may include the same number of stuffer chutes 28 as baling chambers 18, such that crop material may be passed from each stuffer chute 28 into a specific baling chamber 18. For example, the embodiment of the baler 10 illustrated in the figures includes two baling chambers 18. As such, the baler 10 of the figures may correspondingly include two stuffer chutes 28, with each stuffer chute 28 being associated with one baling chamber 18 so as to provide crop material to the associated baling chamber 18.

Figure 6:
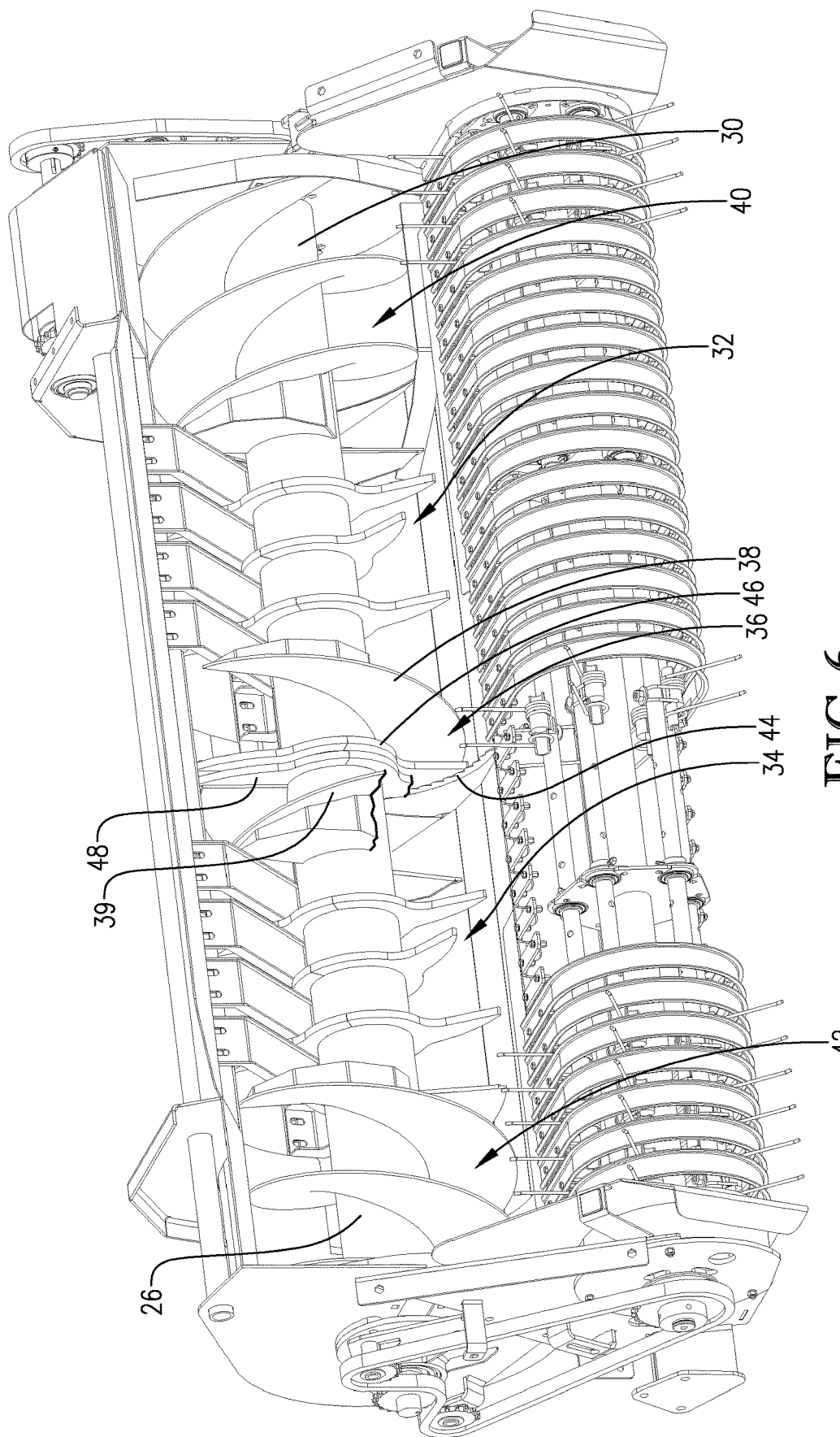
FIG. 6 is a front perspective view of a rotor housing and a pickup mechanism from the baler from FIGS. 1-5, with a rotor being positioned within the rotor housing.

Returning to the rotor housing 24 and the rotor 26, the rotor housing 24 and/or the rotor 26 may be particularly configured to direct crop material received from the pickup mechanism 22 generally evenly into each stuffer chute 28 of the baler 10. For example, as illustrated by FIG. 6, the rotor 26 may be formed as an auger with one or more auger flightings and/or toothed sections configured to direct crop material generally evenly into each stuffer chute 28. In more detail, the rotor 26 may comprise a spindle 30 from which is extended a first toothed section 32, a second toothed section 34, and an interior auger-flighted section 36 located between the first and second toothed sections 32, 34. The first and second toothed sections 32, 34 may each include a plurality of tooth elements extending outward from the spindle 30. The interior auger-flighted section 36 may include one or more sets of helically-shaped auger flightings. In some embodiments, the interior auger-flighted section 36 may include a first set of interior flights 38 configured to push crop material in a first direction and a second set of interior flights 39 configured to push crop material in a second direction generally opposite from the first direction. For example, the first set of interior flights 38 may be configured to push crop material outwardly toward the first toothed section 32, and the second set of interior flights 39 may be configured to push crop material outwardly toward the second toothed section 34.

In some embodiments, the rotor 26 may further comprise a first exterior auger-flighted section 40 and a second exterior auger-flighted section 42 positioned on either end of the spindle 30. As such, the first toothed section 32 may be situated between the first exterior auger-flighted section 40 and the interior auger-flighted section 36 (e.g., the first set of interior flights 38). Similarly, the second toothed section 34 may be situated between the second exterior auger-flighted section 42 and the interior auger-flighted section 36 (e.g., the second set of interior flights 39). As such, the first exterior auger-flighted section 40 is configured to push crop material inwardly toward the first toothed section 32, whereas the second exterior auger-flighted section 42 is configured to push crop material inwardly toward the second toothed section 34.

To further facilitate the distributions and processing of crop material, some embodiments of the baler 10 may include a stationary separation element 44 extending upward from a bottom panel of the rotor housing 24. In some embodiments, the separation element 44 may have a sharpened forward edge so as to act as a blade-like dividing member for cutting crop material that is forced into contact with the separation element 44. In some embodiments, the rotor 26 may include a gap between the first and second sets of interior flights 38, 39 of the interior auger-flighted section 36, such that the separation element 44 can be at least partly received in the gap as the rotor 26 rotates. In some further embodiments, the rotor 26 may further comprise a first interior tooth 46 and second interior tooth 48, which are both positioned between the first and second sets of interior flights 38, 39 of the interior auger-flighted section 36. In some embodiments, the first and second interior teeth 46, 48 may be spaced apart from each other so as to present the gap between the first and second sets of interior flights 38, 39 of the interior auger-flighted section 36. As such, the first set of interior flights 38 may terminate at the first interior tooth 46, while the second set of interior flights 39 may terminate at said second interior tooth 48. Thus, in such embodiments, the first and second interior teeth 46, 48 may be configured to pass on either side of the separation element 44 when the rotor 26 is rotating.

Figure 7:
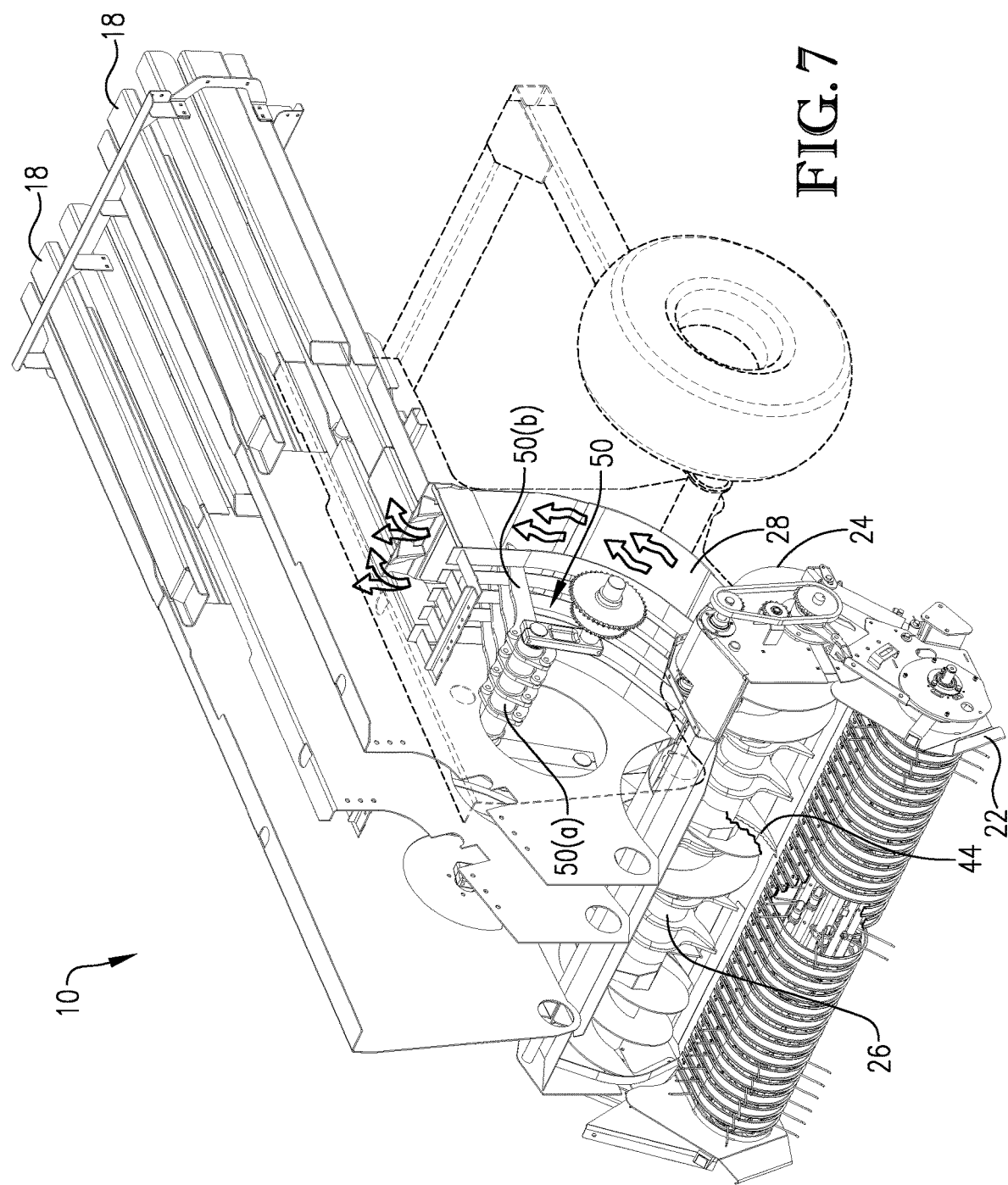
FIG. 7 is a front, left-side perspective view of the baler of FIGS. 1-6, with portions of the baler removed and shown in dashed line, so as to illustrate crop material flowing from a left-side stuffer chute into a left-side baling chamber.
Figure 8:
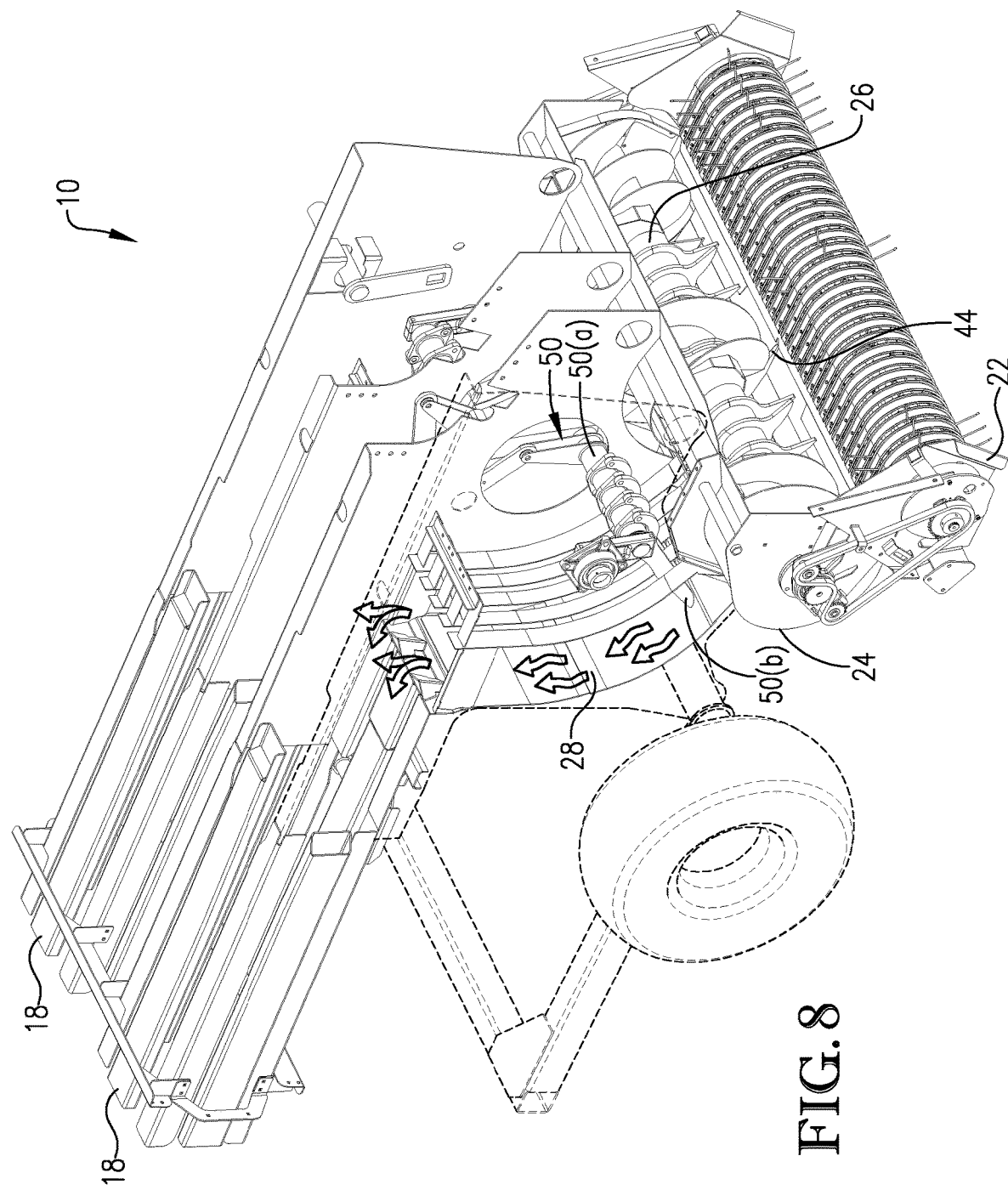
FIG. 8 is a front, right-side perspective view of the baler of FIGS. 1-6, with portions of the baler removed and shown in dashed line, so as to illustrate crop material flowing from a right-side stuffer chute into a right-side baling chamber.

Given the above-described rotor 26 and the separation element 44, embodiments provide for crop material provided to the rotor housing 24 by the pickup mechanism 22 to be directed generally evenly to each of the stuffer chutes 28. In more detail, the baler 10 may, as illustrated in the FIGS. 7 and 8, include two stuffer chutes 28 and two baling chambers 18, with each stuffer chute 28 being associated with one of the baling chambers 18. For example, as shown in FIG. 7, left-side the stuffer chutes 28 may be associated with a left-side baling chamber 18. As shown in FIG. 8, right-side stuffer chutes 28 may be associated with a right-side baling chamber 18. Each of the stuffer chutes 28 may comprise a lower entrance and an upper exit. As such, and as perhaps best illustrated in FIG. 4, crop material is provided from the pickup mechanism 22 into the stuffer chutes 28 via the lower entrances of the stuffer chutes 28, while crop material exits from the stuffer chutes 28 (e.g., into the baling chambers 18) via the upper exits of the stuffer chutes 28. In some embodiments, the lower entrance of each stuffer chute 28 will be wider (or will generally have a larger internal cross section) than the upper exit. As such, crop material introduced into the stuffer chutes 28 can be precompressed during travel from the lower entrance to the upper exit in preparation for introduction into the baling chambers 18. In some embodiments, a ratio of a width (or internal cross section size) of the lower entrance of the stuffer chutes 28 to a width (or internal cross section size) of the upper exit of the stuffer chutes is at least 1.1:1, at least 1.25:1, or at least 1.5:1, and/or not more than 2.5:1, not more than 2:1, or not more than 1.75:1.

To evenly distribute the crop material to the stuffer chutes 28, the first toothed section 32 of the rotor 26 may be aligned with the left-side stuffer chute 28, and the second toothed section 34 of the rotor 26 may be aligned with the right-side stuffer chute 28. As such, when the rotor 26 is rotated (e.g., generally in a counter-clockwise direction when viewing from the left side of the baler 10, as in FIG. 4), the first and second toothed sections 32, 34 can force crop material received from the pickup mechanism 22 downward below the rotor 26 and rearward into the respective stuffer chutes 28. As perhaps best illustrated in FIG. 5, crop material that is received into the rotor housing 24 from the pickup mechanism 22 at a location adjacent to a center of the rotor 26 may be forced outwardly by the interior auger-flighted section 36 towards either the first or second toothed section 32, 34. In some embodiments, portions of the crop material will come into contact with the stationary separation element 44 extending upward from the bottom panel of the rotor housing 24. As noted previously, the separation element 44 may extend upward from generally a center of the bottom panel of the rotary housing 24, such that the separation element 44 extends upward into the gap presented by the first and second interior teeth 46, 48. Thus, crop material may be cut by the separation element 44, as the crop material is forced into the stationary element by the rotating first and second interior teeth 46, 48. The resulting crop material cut by the separation element 44 can then be forced outward by the interior auger-flighted section 36 towards either the first or second toothed section 32, 34, so as to be provided to the respective stuffer chutes 28. Furthermore, crop material that is received into the rotor housing 24 from the pickup mechanism 22 at locations adjacent to ends of the rotor 26 may be forced inwards by the first and second exterior auger-flighted section 40, 42 respectively toward either the first or second toothed section 32, 34, so as to be provided to the respective stuffer chutes 28.

Thus, the baler 10 is particularly configured to collect crop material from a single windrow and process such crop material into a plurality of crop streams. For example, in embodiments that include two baling chambers 18, the crop material may be provided in a first crop stream to a first of the stuffer chutes 28 (e.g., the left-side stuffer chute 28), and in a second crop stream to a second of the stuffer cutes 28 (e.g., the left-side stuffer chute 28). As will be described in more detail below, crop material from the first crop stream may be transferred through the left-side stuffer chute 28 to the left-side baling chamber 18 for formation of bales of crop material. Similarly, crop material from the second crop stream may be transferred through the right-side stuffer chute 28 to the right-side baling chamber 18 for formation of bales of crop material.

In some embodiments, each of the stuffer chutes 28 may be associated with stuffer assembly 50, as shown in FIGS. 7 and 8, for forcing crop material to flow rearward and/or upward through the stuffer chute 28 from the lower entrance to the upper exit. Each stuffer assembly 50 may include a base element 50(*a*) and plurality of stuffer forks 50(*b*) extending from the base element 50(*a*). The stuffer forks 50(*b*) are configured to extend through slots formed in forward panels of the stuffer chutes 28, such that the stuffer forks 50(*b*) can be caused to pass along a length of the stuffer chute 28 (from the lower entrance to the upper exit) so as to force crop material from the lower entrance to the upper exit. As will be described in more detail below, actuation of the stuffer fork 50(*b*) of the stuffer assemblies 50 through the stuffer chutes 28 may be caused by rotation of the base elements 50(*a*) of the stuffer assemblies 50. As was described previously, the width and/or the internal cross section of the upper exit of each stuffer chute 28 is generally smaller than that of the lower entrance. As such, the crop material passing from the lower entrance to the upper exit of a stuffer chute 28 will experience a compressive force (i.e., a pre-compression on the crop material exerted by sides of the stuffer chute 28) before the crop material is provided to its associated baling chamber 18. As illustrated in FIGS. 4, 7, and 8, the upper exit of each stuffer chute 28 is in communication with a forward end of its associated baling chamber 18 (at a bottom side of the baling chamber 18), so that pre-compressed crop material can be provided into the baling chamber 18. Each rotation of the stuffer assembly 50 may force a "charge" of crop material into its associated baling chamber 18.

Upon introduction of a charge of crop material into one of the baling chambers 18, the baler 10 is configured to further compress the crop material into a square bale of crop material. As illustrated in FIGS. 1, 2, 4, 7, and 8, each baling chamber 18 may generally comprise an elongated chamber with a crop inlet at a forward end for receiving charges of crop material from the associated stuffer chute 28 and a bale discharge at a rearward end from which square bales of crop material are discharged from the baling chamber 18 and the baler 10. The crop inlet of each baling chamber 18 may be positioned at the bottom of the baling chamber 18, as illustrated in FIGS. 4, 7, and 8, such that baling chambers are considered "bottom fed," with charges of crop material being provided into the baling chambers from below the baling chambers 18 via associated stuffer chutes 28.

Figure 9:
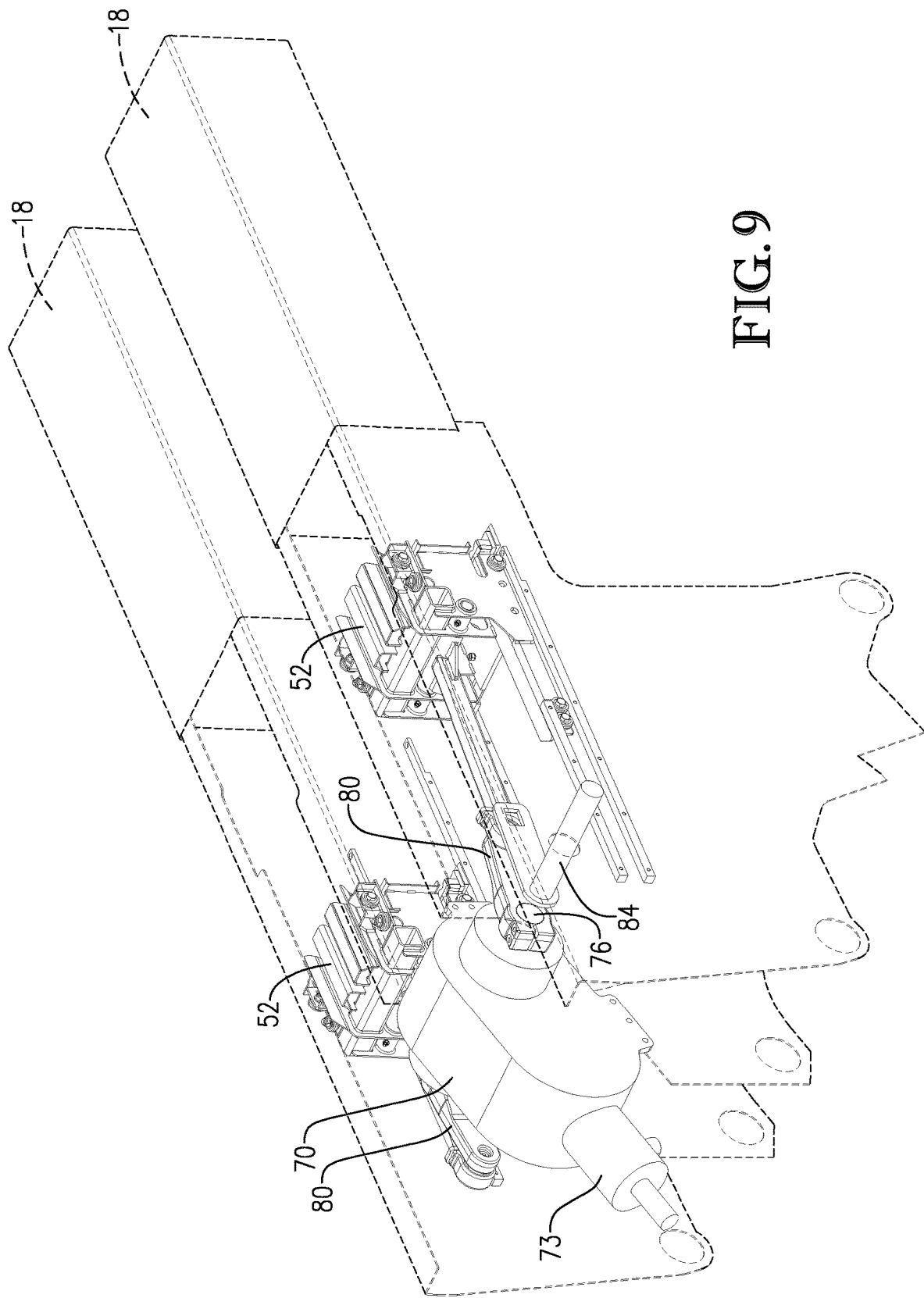
FIG. 9 is a front, left-side view of a gearbox and plungers positioned with the baling chambers of the baler from FIGS. 1-8, with portions of the baler removed or shown in dashed line for clarity.
Figure 10:
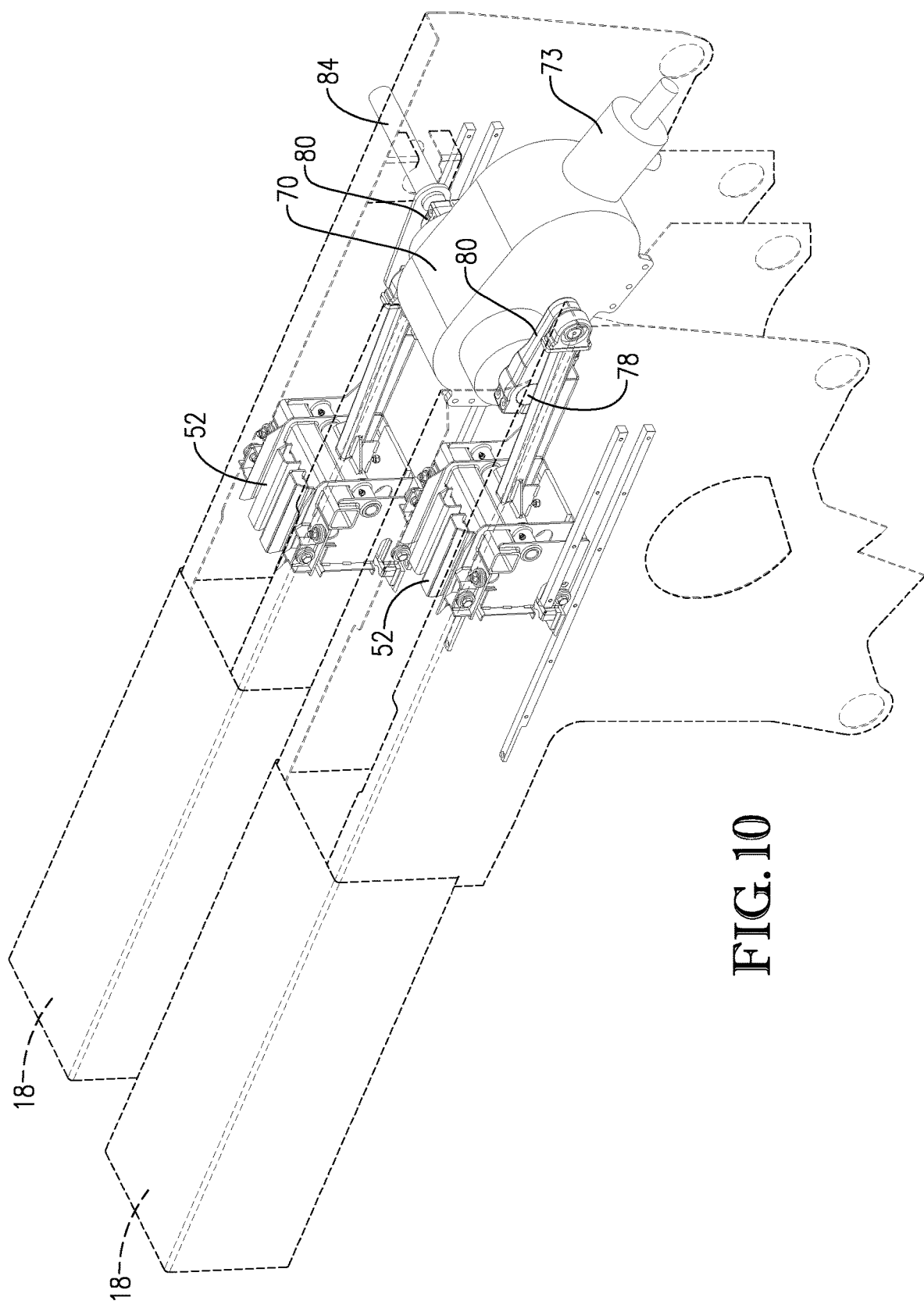
FIG. 10 is a front, right-side view of the gearbox and plungers positioned with the baling chambers of the baler from FIG. 9.

As illustrated in FIGS. 9 and 10, each baling chamber 18 may be associated with a plunger 52 configured to compressing the crop material within the baling chamber 18 to form the square bale of crop material. For instance, in the embodiments shown in the figures, the baler 10 may include two plungers 52, with each plunger 52 being associated with one of the baling chambers 18. Each plunger 52 may be reciprocated within its respective baling chamber 18 between a retracted position and an extended position. In the retracted position (e.g., the solid line plunger 52 of FIG. 4), the plunger 52 may be positioned forward of the baling chamber's 18 crop inlet, such that a charge of crop material may be introduced into the baling chamber 18 from the associated stuffer chute 28. Upon introduction of the charge of crop material into the baling chamber 18, the plunger 52 may be actuated rearward in a compaction stroke (e.g., the dashed line plunger 52 of FIG. 4) so as to compress the charge of crop material into a flake of a square bale. The plunger 52 will continue reciprocating between retracted and extended positions, as charges of crop material are added into the baling chamber 18, so as to compress crop material into a fully formed square bale. By having multiple baling chambers 18, each being associated within its own plunger 52, the baler 10 is configured to simultaneously create multiple bales of crop material, with such crop material being obtained by the baler 10 from a single windrow.

In more detail, and with reference to FIG. 2, each baling chamber 18 may be generally rectangular with a pair of sidewalls 54, a top wall 56, and a bottom wall 58. In some embodiments, the walls 54, 56, 58 may each be formed from one or more rails that are configured and/or secured together in a rectangular shape. As such, the walls 54, 56, 58 of each baling chamber 18 define an interior baling space within which the plunger 52 can extend and retract so as to compress crop material into square bales. The interior baling space is generally of a fixed dimension, such that each new charge of crop material received from the associated stuffer chute 28 can be packed and compressed rearwardly as a flake of crop material against previously compacted flakes that will collectively form a bale of crop material.

In some embodiments, a cross-sectional area of each baling chamber 18 may decrease moving from a forward end to a rearward end of the baling chamber 18. Such a reduction in a cross-sectional area can facilitate the ability of the baling chambers 18 to compress the crop material into square bales during formation of the bales. As such, the baling chambers 18 may be configured to exert pressure on all four sides of the bales as the bales move rearward through the baling chambers 18. Furthermore, in some embodiments, each baling chamber 18 may include an independent compression assembly 60, as shown in FIG. 2, for aiding in compression of the walls 54, 56, 58 of the baling chambers 18. In some embodiments, the compression assemblies 60 may be positioned near the rearward ends of the baling chambers 18. Each compression assembly 60 may include a vertical compression mechanism for adjusting a vertical distance between the top wall 56 and the bottom wall 58, as well as a horizontal compression mechanism for adjusting the horizontal distance between the sidewalls 54. In some embodiments, each of the vertical and horizontal compression mechanisms may comprise hydraulic, pneumatic, or electrical cylinders, configured to be manually or automatedly adjustable. As such, each baling chamber 18 may be configured, e.g., due to the compression provided by the compression assembly 60, to exert pressure on all four sides of the bales formed therein. In addition to facilitating compression, in some embodiments, the compression assemblies 60 may also be used to adjust the size of the discharge openings presented by the rearward ends of the baling chambers 18. The use of independent compression assemblies 60 with each baling chamber 18, allows for the baler 10 to establish a set pressure on each side of a bale being formed in a given baling chamber 18 so as to minimize variation in bale length and density.

As noted above, the baler 10 according to embodiments of the present invention may include a plurality of baling chambers 18, each being configured to generate individual square bales of crop material. As such, the baler 10 can simultaneously form multiple square bales from crop material obtained from a single windrow. In some embodiments, as illustrated in the figures, the baler 10 will include two spaced apart, side-by-side baling chambers 18. Such baling chambers 18 may extend in a generally fore-and-aft direction with respect to the chassis 12. The baling chambers 18 may extend in a generally parallel relationship with each other (and/or with the longitudinal centerline of the of the chassis 12 and/or the baler 10), with one baling chamber 18 positioned on one side of the longitudinal centerline of the chassis 12 of the baler 10, and the other baling chamber 18 positioned on the other side of the longitudinal centerline of the chassis 12 of the baler 10. In some embodiments, the baling chambers 18 may be spaced from one another by not more than sixty inches, not more than forty-eight inches, not more than thirty-six inches, or not more than twenty-four inches. In alternative or additional embodiments, the baling chambers 18 may be spaced from one another by at least one inch, at least three inches, at least six inches, at least twelve inches, or at least eighteen inches. Beneficially, having the baling chambers 18 spaced apart can make it simpler to implement mechanisms that handle, accumulate, and/or sort bales that are formed in and dispensed from the baling chambers 18.

In alternative embodiments, the baling chambers 18 may not be spaced apart from each other. For example, the baling chambers 18 may be separated by (or share) a common interior wall, such that no air gap exists between the baling chambers 18. For example, the common interior wall may comprise the interior sidewall 54 of the adjacent baling chambers 18, such that the baling chambers 18 are not spaced apart. In some embodiments, an entire length of the baling chambers 18 may be separated by the common interior wall.

In some further embodiments, the baling chambers 18 may not be separated by any interior walls. For example, four walls (e.g., a pair of sidewalls 54, a top wall 56, and a bottom wall 58) may define a common interior baling space that includes two baling chambers 18. As such, the two baling chambers 18 can share a common interior baling space so that two bales can be simultaneously formed within the common interior baling space.

As was noted above, each of the baling chambers 18 may include a plunger 52 for compacting crop material in the baling chamber 18 to form a square bale of crop material. In an embodiment of the baler 10 that include two baling chambers 18, as shown in the figures, the baler 10 may include two plungers 52 (See, e.g., FIGS. 9 and 10). In such embodiments, the plungers 52 may be driven, directly or indirectly, by a common gearbox 70, which is illustrated in FIGS. 1-4, 9, and 10. The gearbox 70 may be supported on top of the chassis 12 and positioned adjacent to the front of the chassis 12. As such, a rotating power source, such as power take-off 72 from the tow vehicle (See, e.g., FIGS. 1 and 2), may be engaged with the gearbox 70 to provide rotary power from the tow vehicle to the baler 10. As illustrated in FIG. 1, the gearbox 70 may comprise an input element 73, which is configured to be rotated by the rotating power source, e.g., the power take-off 72, about an input axis of rotation so as to provide rotational power to the gearbox 70. The baler 10 may additionally include a flywheel 74 positioned between the gearbox 70 and the power take-off 72, which is configured to store rotational energy for provision to the gearbox 70 as necessary. In some alternative embodiments, the baler 10 may include a rotating power source in the form of a hydraulic pump/motor (not shown). The hydraulic pump/motor may, in some embodiments, itself be engaged with the power take-off 72 to receive power from the tow vehicle. Regardless, the gearbox 70 may be connected with the pump gearbox to receive rotary power therefrom.

Figure 3:
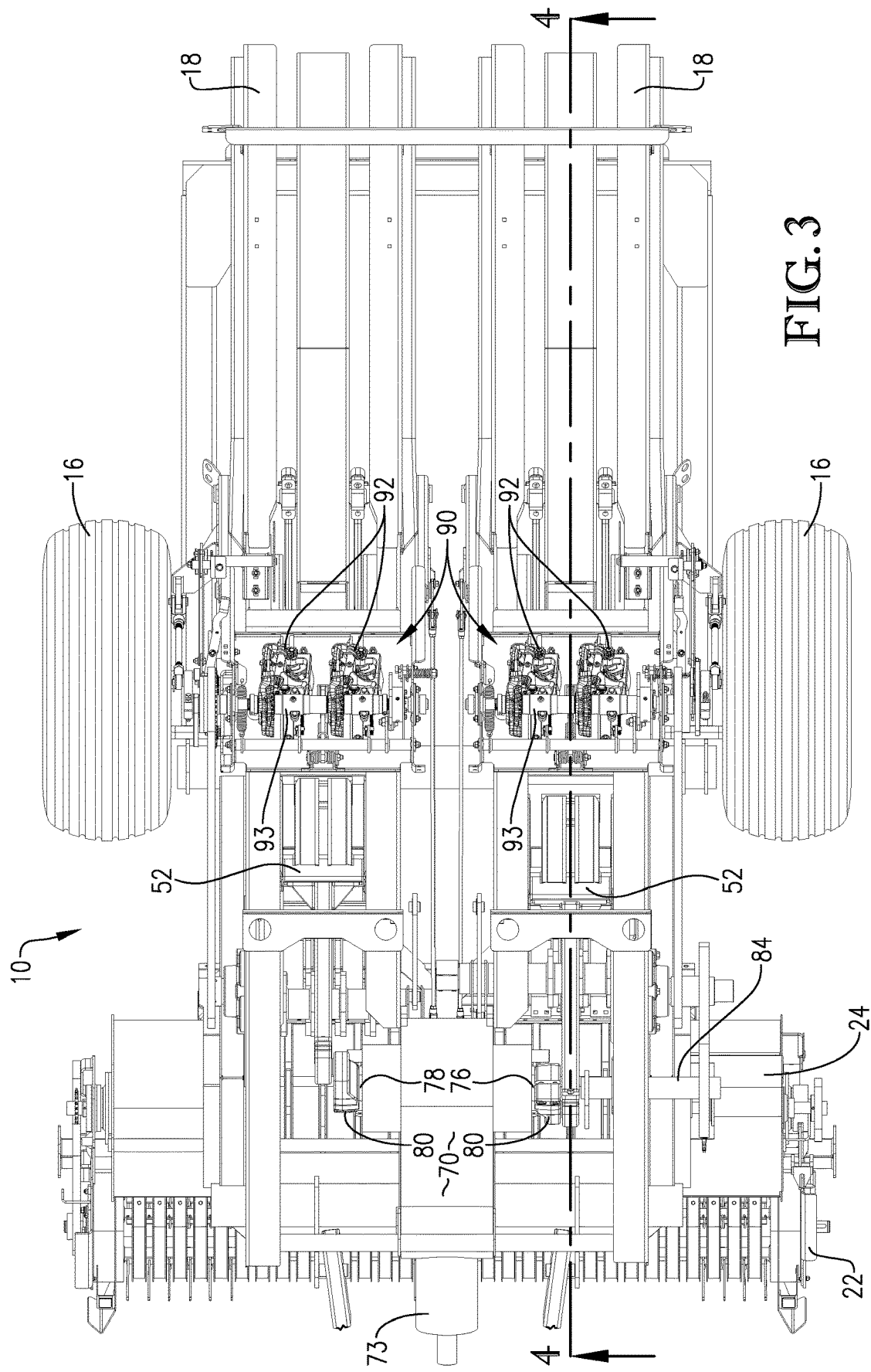
FIG. 3 is a top plan view of the baler from FIGS. 1 and 2, with a portion in front of the baler, including a chassis, removed.

In some embodiments, as shown in FIGS. 3, 9, and 10, the gearbox 70 may comprise a first drive shaft section 76 extending outward from a first side (e.g., a left side) of the gearbox 70, and a second drive shaft section 78 outward from a second side (e.g., a right side) of the gearbox 70. As such, the first and second drive shaft sections 76, 78 may extend outwardly from generally opposite sides of the gearbox 70. The first and second drive shaft sections 76, 78 may be configured to rotate on respective first and second drive shaft axes of rotation. In certain embodiments, each of the first and second drive shaft axes of rotation is angled relative to the input axis of rotation of the gearbox 70 (as presented by the input element 73) between sixty and one-hundred twenty degrees, between seventy and one-hundred degrees, or between eighty and one hundred degrees. In some embodiments, the first and second drive shaft axes of rotation may be skewed. In other embodiments, the first and second drive shaft axes of rotation may be parallel or colinear. For example, the first and second drive shaft sections 76, 78 may be configured to rotate on a common substantially horizontal axis of rotation. The gearbox 70 may further include a common drive shaft extending through the gearbox 70 and comprising the first and second drive shaft sections 76, 78.

In general, the gearbox 70 is configured as a rotating power source that is used to rotate the first and second drive shaft sections 76, 78 using power from the external rotating power source, e.g., the power take-off 72. In embodiments of the baler 10 that include two plungers 52, as illustrated in FIGS. 3, 9, and 10, a left-side plunger 52 may be coupled to the first drive shaft section 76, while a right-side plunger 52 may be coupled to the second drive shaft section 78. As such, the left-side plunger 52 may be positioned on an opposite side of the gearbox 70 as the right-side plunger 52. As illustrated in FIGS. 9 and 10, each of the drive shaft sections 76, 78 may be connected to a respective plunger 52 via a connecting element 80 that is pivotally connected between the plunger 52 and respective ones of the drive shaft sections 76, 78 so as to transfer the generally circular movement of the drive shaft sections 76, 78 to reciprocation actuations of the plungers 52.

Under power from the gearbox 70, rotation of the first drive shaft section 76 will cause reciprocation of the left-side plunger 52 and rotation of the second drive shaft section 78 will cause reciprocation of the right-side plunger 52. As was described previously, each of the plungers 52 is configured to reciprocate between the extended position and the retracted position. The gearbox 70 may, in some embodiments, be configured to actuate the plungers 52, such that the left-side and right-side plungers 52 are reciprocated in an alternative fashion. As such, when the left-side plunger 52 is in the extended position, the right-side plunger 52 is in the retracted position, and vice versa. Such positioning may be facilitated by the connecting elements 80 being orientated generally one-hundred eighty degrees out of phase (in certain embodiments with two plungers 52). For instance, as shown in FIGS. 9 and 10, the left-side connecting element 80 is orientated rearward such that the left-side plunger 52 is in the extended position, while the right-side connecting element 80 is orientated forward such that the right-side plunger 52 is in the retracted position. Alternatively, although not shown in the drawings, the right-side connecting element 80 can be orientated rearward such that the right-side plunger 52 is in the extended position, while the left-side connecting element 80 can be orientated forward such that the left-side plunger 52 is in the retracted position. The plungers 52 being offset can allow for the spreading of drive louds and allows for smaller drive components.

In some embodiments, a point of connection between the left-side plunger 52 and the left-side connecting element 80 will be spaced from the axis of rotation of the first drive shaft section 76, such that the connection may be eccentric. In some embodiments, the first drive shaft section 76 may terminate at the left-side connecting element 80. In addition, in some embodiments, the point of connecting between the right-side plunger 52 and the right-side connecting element 80 will be spaced from the axis of rotation of the second drive shaft section 78, such that the connection may be eccentric. In some embodiments, the second drive shaft section 78 may terminate at the right-side connection element 80.

As was briefly noted above, in some embodiments, the left-side and right-side connecting elements 80 may be rotationally offset from one another with respect to the rotation of the first and second drive shaft sections 76, 78. In some specific embodiments, the left-side and right-side connecting elements 80 may be rotationally offset from one another by about one-hundred eighty degrees, about one-hundred twenty degrees, or about ninety degrees with respect to the axes of rotation of the first and second drive shaft sections 76, 78. In other embodiments, the left-side and right-side connecting elements 80 may be rotationally aligned with one another with respect to the axes of rotation of said first and second drive shaft sections 76, 78. In further embodiments, the relative rotational positioning of the left-side and right-side connecting elements 80 with respect to the rotation of said first and second drive shaft sections 76, 78 may either be i) aligned with one another or ii) offset from one another by an amount of rotational degrees approximately equal to three-hundred and sixty divided by the total number of reciprocating plungers 52 included in the baler 10. Thus, in embodiments of the baler 10 that include two plungers 52, the relative rotational positioning of the left-side and right-side connecting elements 80 with respect to the rotation of said first and second drive shaft sections 76, 78 may be about one-hundred and eighty degrees. Nevertheless, it should be understood that in some embodiments, the baler 10 may include more than two plungers 52.

In some further embodiments of the gearbox 70, the first drive shaft section 76 may include an auxiliary drive shaft 84, as perhaps best illustrated in FIGS. 3 and 9, which extends outwardly from and/or past the left-side connecting element 80. In alternative embodiments, the auxiliary drive shaft 84 may be included as part of the second drive shaft section 78 and may extend outwardly from and/or past the left-side connecting element 80. In further alternatives, the gearbox 70 may include a pair of auxiliary drive shafts 84, with one associated with each of the first drive shaft section 76 and the second drive shaft section 78. The baler 10 may comprise at least one auxiliary driven mechanism directly or indirectly powered by the auxiliary drive shaft 84. For example, such an auxiliary driven mechanism may comprise the pickup mechanism 22, the rotor 26, the stuffer assemblies 50, and/or one or more knotter assemblies (described in more detail below). The baler 10 may include one or more chains, belts, or the like that interconnect gears, sprockets, pulleys, etc. associated with the auxiliary drive shaft 84 and the auxiliary driven mechanisms. As such, the auxiliary drive shaft 84 can provide power (e.g., rotary power) to the auxiliary driven mechanisms.

Figure 5:
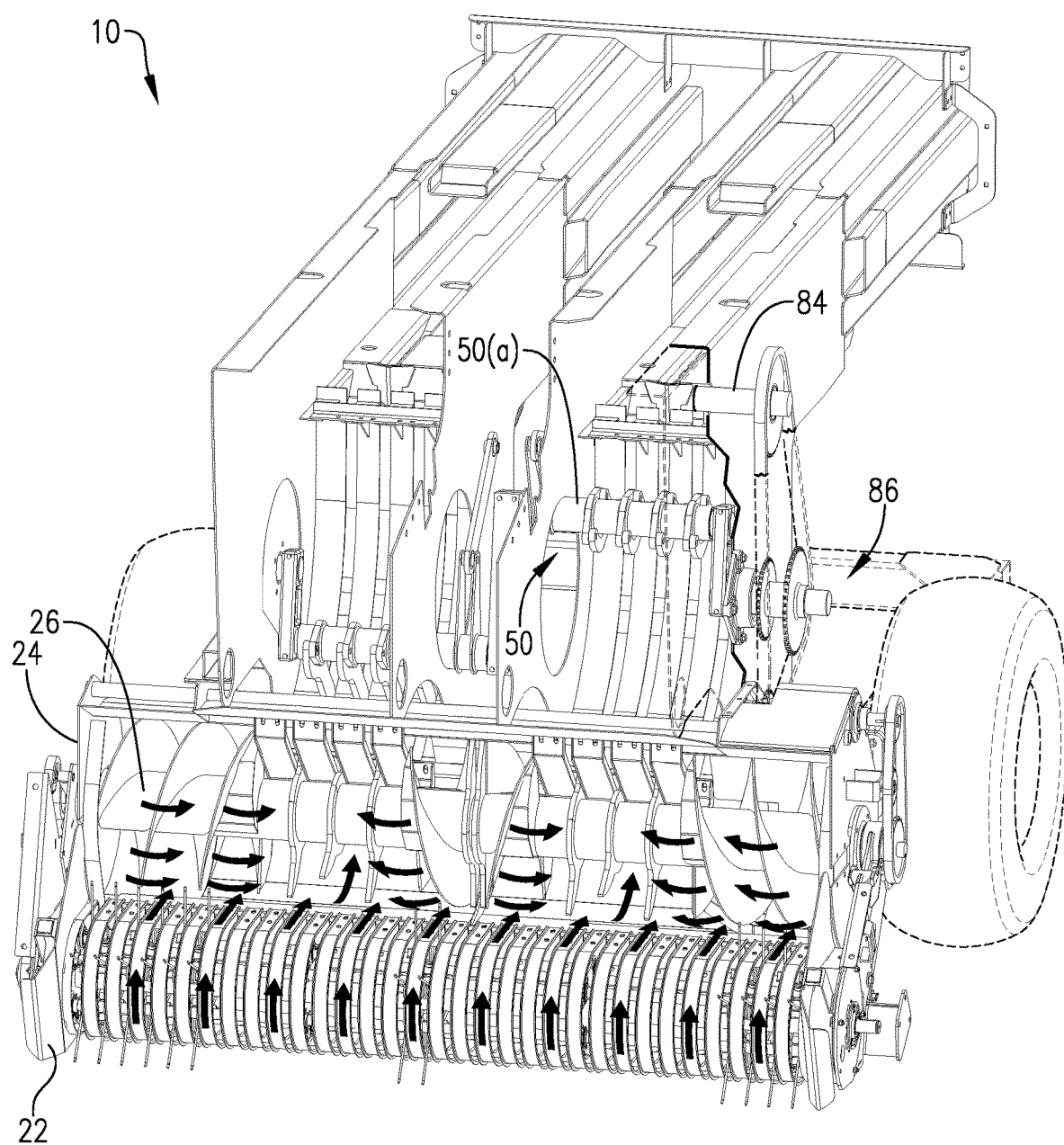
FIG. 5 is a front perspective view of the baler from FIGS. 1-4, provided with arrows to illustrate crop material flow through the baler, and with a portion of the baler removed to illustrate stuffer chutes, stuffer assemblies, and baling chambers of the baler.

For example, as illustrated in FIG. 1, a distal end of the auxiliary drive shaft 84 may include a sprocket, which rotates simultaneously with the auxiliary drive shaft 84. A chain may connect the sprocket of the auxiliary drive shaft 84 with a drive input assembly 86 associated with one of the stuffer assemblies 50 (e.g., the left-side stuffer assembly 50), as illustrated in FIG. 1. The drive input assembly 86 may include a sprocket that can be engaged with the chain extending from the sprocket of the auxiliary drive shaft 84. As such, the drive input assembly 86 may be configured to receive rotary power from the auxiliary drive shaft 84. As illustrated in FIG. 5, the drive input assembly 86 may be connected to the base element 50(*a*) of one of the stuffer assemblies 50 (e.g., the left-side stuffer assembly 50) via a connection element. As such, rotation of the drive input assembly 86 (as caused by the auxiliary drive shaft 84) will provide a corresponding rotation to the base element 50(*a*) of the left-side stuffer assembly 50, thereby powering the left-side stuffer assembly 50 for operation.

Figure 11:
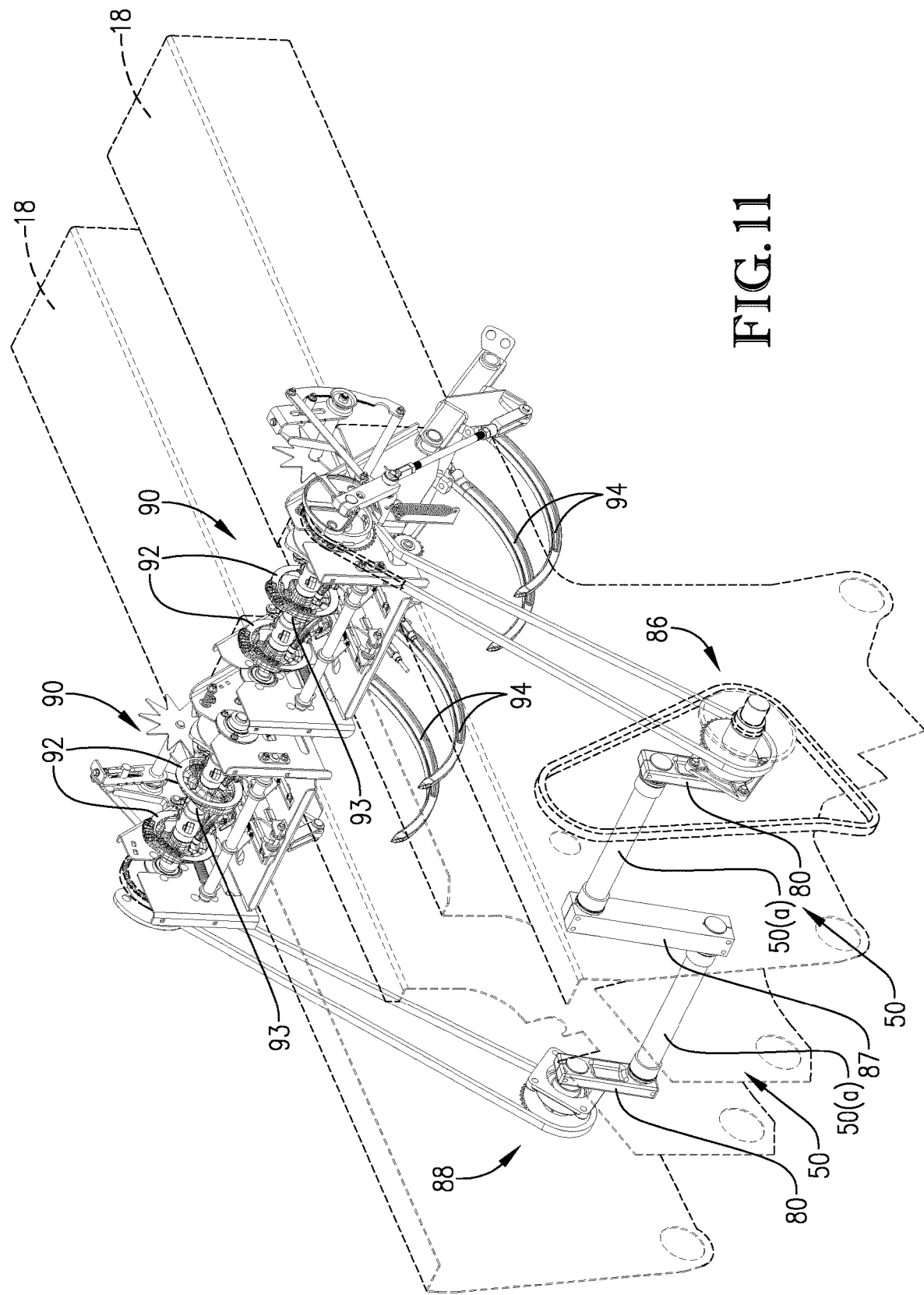
FIG. 11 is a front left-side view of knotter assemblies and stuffer assemblies from the baler of FIGS. 1-8 being rotationally linked via chains and sprockets.

As described above, in certain embodiments, the baler 10 may include two stuffer assemblies 50. In some of such embodiments, one of the stuffer assemblies 50 (e.g., the left-side stuffer assembly 50) may be connected with the other stuffer assembly 50 (e.g., the right-side stuffer assembly 50), such that rotation of the left-side stuffer assembly 50 will cause a corresponding rotation of the right-side stuffer assembly 50. For example, as illustrated in FIG. 11, the left-side and right-side stuffer assemblies 50 may be interconnected by a connection element 87 that permits a rotation of one of the left-side or right-side stuffer assemblies 50 to cause a rotation of the other of the left-side or right-side stuffer assemblies 50. For instance, as discussed above, the auxiliary driveshaft 84 may provide rotational power to the left-side stuffer assembly via the drive input assembly 86. Such rotation of the left-side stuffer assembly 50 may cause a corresponding rotation of the right-side stuffer assembly via the connection element 87. In some additional embodiments, as illustrated in FIG. 11, the base element 50(*a*) of the right-side stuffer assembly 50 may be connected to a drive output assembly 88 via a connection element. As will be described in more detail below, the drive output assembly 88 may be used to provide rotary power to other components of the baler 10.

Some embodiments provide for the left-side and right-side stuffer assemblies 50 to be offset by one-hundred and eighty degrees. As such, for instance, when the left-side stuffer assembly 50 is in an upward or top position, the right-side stuffer assembly 50 will be in the lower or bottom position. In addition, the position of the stuffer assemblies 50 may, in some embodiments, correspond with the positions of the plungers 52. For example, when the left-side stuffer assembly 50 is in the upward or top position, the left-side plunger 52 will be in the retracted position, such that crop material may be fed into the left-side baling chamber 18 by the left-side stuffer assembly 50. In such a configuration, the right-side stuffer assembly 50 will be in a lower or bottom position and the right-side plunger 52 will be in the extended position. As such, when the left-side stuffer assembly 50 is in the top position, the left-side plunger 52 will correspondingly be in the retracted position, such that crop material may be fed into the left-side baling chamber 18 from the left-side stuffer chute 28 by the left-side stuffer assembly 50 in preparation for compression stroke by the left-side plunger 52 to form a compacted square bale within the left-side baling chamber 18.

From the configuration discussed above, the gearbox 70 can rotate the stuffer assemblies 50, e.g., via the connection (e.g., the chains and sprockets) between the auxiliary drive shaft 84 and the stuffer assemblies 50 (e.g., via the drive input assembly 86), such that the right-side stuffer assembly 50 is shifted to the top position and the left-side stuffer assembly 50 is shifted to the bottom position. During such actuation, the gearbox 70 can simultaneously shift the right-side plunger 52 (e.g., via the second drive shaft element 78) to the retracted position and the left-side plunger 52 (e.g., via the first drive shaft element 76) to the extended position. As such, when the right-side stuffer assembly 50 is in the top position, the right-side plunger 52 will correspondingly be in the retracted position, such that crop material may be fed into the right-side baling chamber 18 by the right-side stuffer assembly 50 in preparation for compression stroke by the right-side plunger 52 to form a compacted square bale within the right-side baling chamber 18. In such a configuration, the left-side stuffer assembly 50 will be in the bottom position and the left-side plunger 52 will be in the extended position. As such, while the right-side plunger 52 is compacting crop material to form a bale, the left-side stuffer assembly 50 is in the downward position preparing to collect and push crop material upward through the left-side stuffer chute 28 once the left-side plunger 52 has been retracted.

In some embodiments, as shown in FIG. 1, the auxiliary drive shaft 84 may be further connected with the rotor 26 (e.g., via chain and sprockets), such that rotation of the auxiliary drive shaft 84 will cause actuation of the rotor 26 within the rotor housing 24. Similarly, in some embodiments, the auxiliary drive shaft 84 may be connected with the pickup mechanism 22 (e.g., via chain and sprockets), such that rotation of the auxiliary drive shaft 84 will cause actuation of the tined rotating member of the pickup mechanism 22. Alternatively, as shown in FIG. 2, the pickup mechanism 22 may be interconnected with the rotor 26 (e.g., via chain and sprockets), such that rotation of the rotor 26 (e.g., as perhaps caused by the auxiliary drive shaft 84) may cause a corresponding rotation of the tined rotating member of the pickup mechanism 22.

In addition to the auxiliary driven mechanisms discussed above, some embodiments of the baler 10 may include a plurality of knotter assemblies 90, as shown in FIGS. 1-3 and 11-13, for tying one or more securement lines (e.g., twine, wire, cord, etc.) around the square bales of crop material being formed in the baling chambers 18. In some embodiments, the baler 10 may include one knotter assembly 90 for each baling chamber 18, such that each bale of crop material may be wrapped and tied with securement lines. In some embodiments, each knotter assembly 90 may include a pair of knotting mechanisms 92, as illustrated in FIGS. 2, 3, and 11, each configured to wrap and tie a securement line around each square bale formed in the associated baling chamber 18. For instance, the left-side knotter assembly 90 may include a pair of knotting mechanisms 92, and the right-side knotter assembly 90 may include a pair of knotting mechanisms 92. As such, in some embodiments, the baler 10 may provide for each bale of crop material formed in each baling chamber 18 to be tied with two securement lines. Each knotting mechanism 92 may include the components necessary to apply a securement line around a bale of crop material and to securely tie/knot the securement line onto the bale. For example, each knotting mechanism 92 may include: a knotter disc, a billhook assembly (e.g., a billhook, a billhook spring, a billhook cam, a billhook pinion), strand holder, strand knife, etc. Each knotter assembly 90 may include a rotatable shaft 93, which may be configured as an axle, and which is configured actuate various of the components of the associated knotting mechanisms 92. As such, the left-side knotter assembly 90 may include one rotatable shaft 93, and the right-side knotter assembly may include one rotatable shaft 93.

Figure 12:
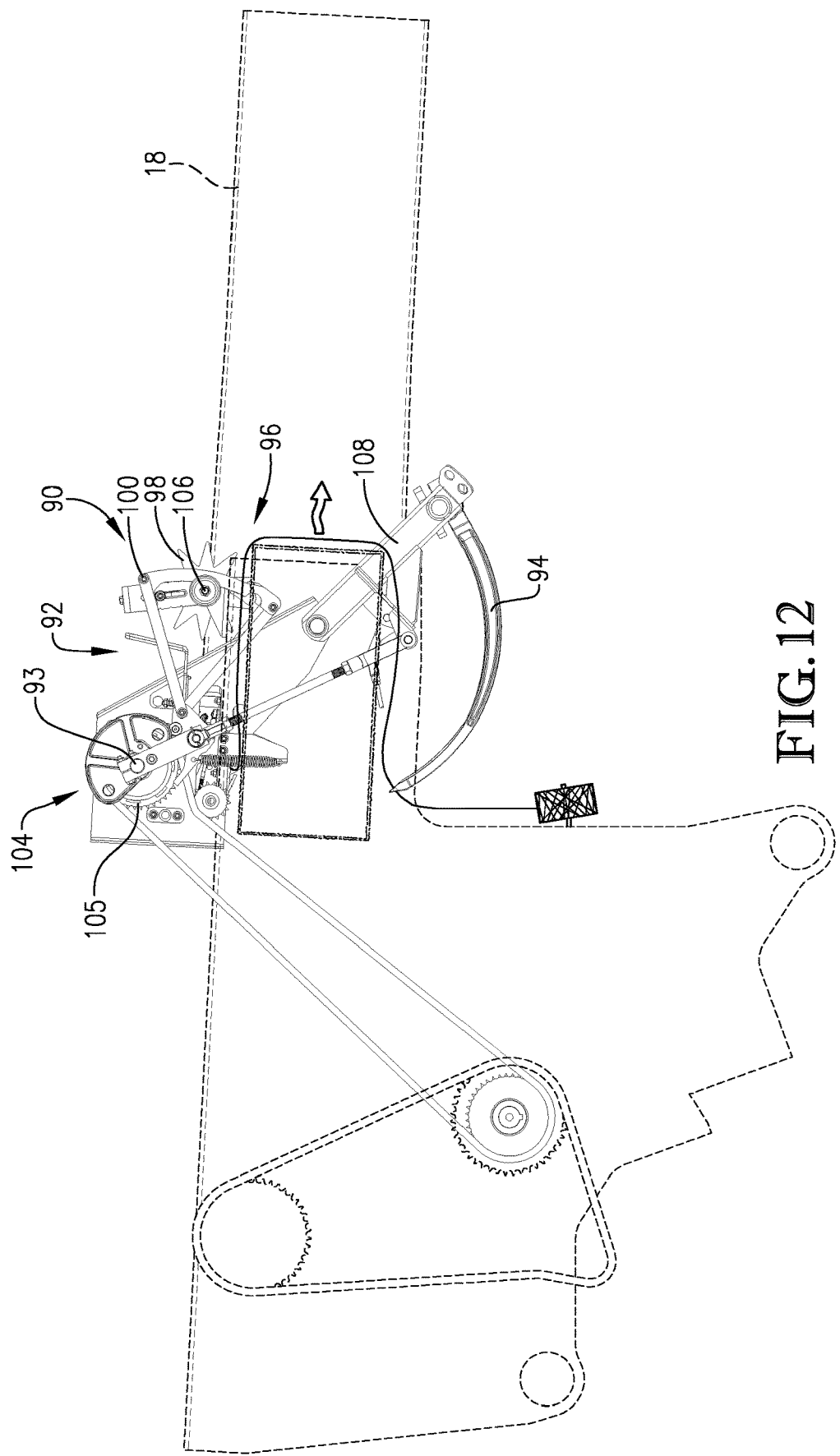
FIG. 12 is a left-side elevation view of a portion of the baler from FIGS. 1-8, particularly showing a bale of crop material being formed in a left-side baling chamber and a needle of a knotter assembly in a lowered position.
Figure 13:
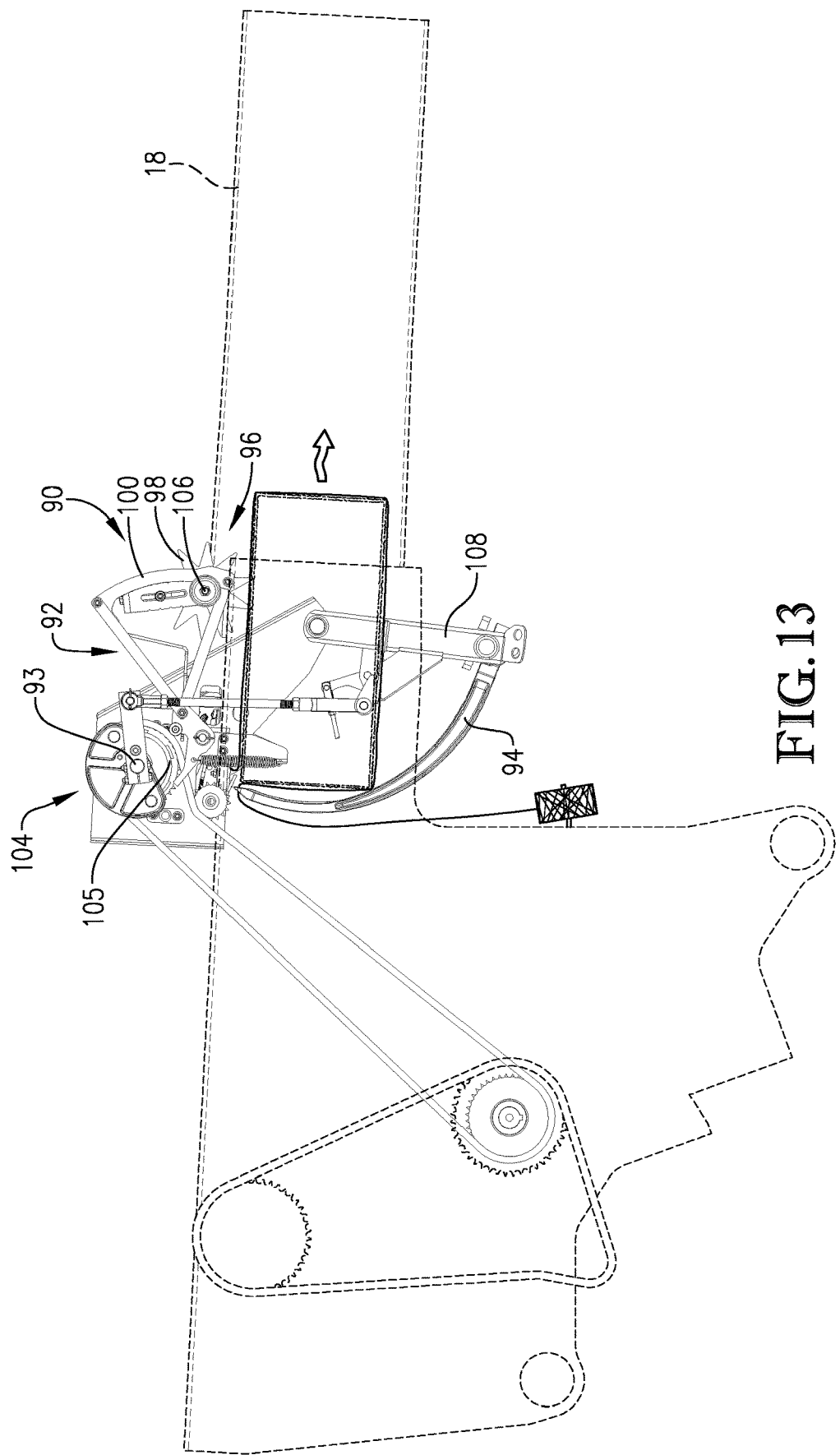
FIG. 13 is a left-side elevation view of the portion of the baler from FIG. 12, particularly showing the needle in a raised position.

In addition, each of the knotter assemblies 90 may include one or more needles 94, as illustrated in FIGS. 11-13, operably associated with each knotting mechanism 92. Each of the needles 94 may be used to wrap a securement line completely around a bale of crop material once the bale is fully formed, such that the associated knotting mechanism 92 can tie the securement line securely around the fully formed bale. FIG. 12 illustrates a needle in a lowered position, holding a securement line below a bale as the bale is being formed in the baling chamber 18. The securement line may be obtained from a spool of securement line held in an un-shown container or compartment of the baler 10. FIG. 13 illustrates the needle 94 in a raised position, such that the needle 94 brings the securement line up to the knotting mechanism 92 for tying off around the bale. Upon the needle 94 being lowered from the raised position, the needle 94 will start a subsequent strand of securement line around the subsequently-formed bale. It should be understood that FIGS. 12 and 13 illustrate a single knotting mechanism 92 and a single needle 94, which can be used to wrap and tie a single securement line around a bale. However, as was noted above, each knotter assembly 90 may include a plurality of knotting mechanisms 92 and a corresponding plurality of needles 94, such that each knotter assembly 90 can be configured to wrap and tie a plurality of (e.g., two) securement lines around a bales being formed in a baling chamber 18.

As illustrated in FIGS. 1 and 2, each knotter assembly 90 may additionally comprise a trip mechanism 96 that can be used to initiate the tying process once a bale of crop material has been fully formed. With reference to FIGS. 12 and 13, each trip mechanism 96 may include a starwheel 98, a measuring assembly 100, and a clutch mechanism 104 configured to permit associated knotting mechanisms 92 to tie a knot around a bale of crop material upon the bale being formed to a pre-selected size. In more detail, the starwheel 98 may be configured to engage a top surface of a bale of crop material as the bale is being formed within the baling chamber 18. Specifically, the starwheel 98 is configured walk along a top surface of the bale, such that the starwheel 98 rotates about a shaft 106 as the bale moves rearward through the baling chamber 18. The shaft 106 may be operably engaged with the measuring assembly 100, which comprises a notched arc and a pair of trip arms. As the starwheel 98 rotates, the shaft 106 will engage with the notched arc, so as to actuate the trip arms. The trip arms can be operably connected to the clutch mechanism 104. The clutch mechanism 104 may include a sprocket 105 that is constantly driven, directly or indirectly as will be discussed in more detail below, by the auxiliary drive shaft 84 of the gearbox 70. Embodiments provide for the clutch mechanism 104 to be selectively engaged so as to drive the rotatable shaft 93 and, thus, the knotting mechanisms 92 of the associated knotter assembly 90. In addition, the clutch mechanism 104 may also be operably connected to a needle frame 108 that supports the needles 94 of the associated knotter assembly 90, such that the selective engagement of the clutch mechanism 104 will actuate the needle frame 108 and the needles 94 thereon from the lowered position (e.g., FIG. 12) to the raised position (e.g., FIG. 13). It should be understood that although FIGS. 12 and 13 illustrate the left-side knotter assembly 90 with the left-sided trip mechanism 96 discussed above, the right-side knotter assembly 90 includes a right-side trip mechanism 96 with generally the same components and that functions in generally the same manner as the left-sided trip mechanisms 96.

Embodiments provide for the trip mechanism 96 of each knotter assembly 90 to be particularly configured (e.g., due to a size of the starwheel 98 and/or to additional configurations of the measuring assembly 100) so as to initiate the tying of knots of the securement lines by each knotting mechanism 92 of the knotter assembly 90 once a bale has been fully formed to the appropriate size (e.g., the appropriate length). Broadly, the measuring assembly 100 will be configured to measure a size and/or length of bales being formed in the baling chambers 18. In more detail, as a bale of crop material is being formed in a baling chamber 18 (i.e., via the cyclical compressions of flakes of crop material by the reciprocating plunger 52), the bale will travel rearward through the baling chamber 18. In embodiments in which each knotter assembly 90 includes two knotting mechanisms 92, each knotting mechanism 92 will hold a securement line, such that the two securement lines will extend downward through the baling chamber 18 to tips of the respective needle 94. As the bale travels rearward, the two securement lines will wrap against a rear surface of the bale, as well as over a top and bottom of the bale, as illustrated in FIG. 12. During such travel, the starwheel 98 will walk along the top surface of the bale until the pre-determined bale length has been reached (e.g., as configured by the measuring assembly 100). At such time, the measuring assembly 100 will engage the clutch mechanism 104 so as to simultaneously cause rotation of the shaft 93 and actuation of the needle frame 108. Specifically, as shown in FIG. 13, the needle frame 108 will be actuated so as to force the pair of needles 94 upward, each bringing their securement line upward around a front side of the bale and adjacent to a corresponding knotting mechanism 92 that will tie the securement line securely onto the bale. The securement lines will be cut, so as to similarly allow for another securement line to be wrapped around and securely tied to a subsequently-formed bale of crop material. Upon being wrapped with the securement lines, the formed bale can be ejected from bale discharge at the rear end of the baling chamber 18.

In some alternative embodiments, the baler 10 may include trip mechanisms 96 that comprise electronic measuring assemblies that may include electrical and/or electro-mechanical components. For example, each starwheel 98 may be associated with an electronic sensor for measuring a length of the bale passing through the relevant baling chamber 18. The electronic sensor may be a rotary encoder, an optical sensor, or the like. The electronic sensor may measure the length of the bale passing through the associated baling chamber 18, and the resulting bale length data may be provided to an electronic control unit positioned on the baler 10 or on the tow vehicle The electronic control unit may include memory elements and processing elements configured to analyze the bale length data for a bale and to send resulting instructions to the clutch mechanism 104 upon the bale reaching a pre-determined bale length. In more detail, the electronic sensor may obtain bale length data for a given bale and may provide such bale length data to the electronic control unit. Upon the electronic control unit determining from the bale length data that the given bale has reached a fully-formed length (as may be pre-determined/pre-defined), the electronic control unit may send a signal or instruction to the clutch mechanism 104 to cause actuation of the knotting mechanisms 92 and related needles 94 so as to tie off securement lines around the fully formed bale. In embodiments in which the baler 10 includes multiple baling chambers 18 (each having its own starwheel 98 and clutch mechanism 104), each starwheel 98 may include its own electronic sensor for measuring the lengths of the bales being formed in its associated baling chamber 18. The electronic control unit may receive bale length data from each electronic sensor and may send independent instructions to each clutch mechanism 104 to tie off the bales in each baling chamber once each bale has been fully formed to the pre-determined bale length.

Beneficially, the knotter assemblies 90 of the baler 10 are configured to operate independently of one another. As such, the bales being formed in each of the baling chambers 18 can be wrapped and tied at different times, when the bales have been fully formed. For example, if two bales are being formed in the baler 10, one in the left-side baling chamber 18 and one in the right-side baling chamber 18, the left-side knotter assembly 90 can tie off the securement lines around the bale being formed in the left-side baling chamber 18 when the bale is fully formed (i.e., to the predetermined bale length), and the right-side knotter assembly 90 can tie off the securement lines around the bale being formed in the right-side baling chamber 18 when the bale is fully formed (i.e., to the predetermined bale length). However, because such bales may become fully formed at different times, e.g. due to variations in the amount of crop material being provided to the individual baling chambers 18, the knotter assemblies 90 associated with each baling chamber 18 may initiate tying of the securement lines at different times. As such, the baler 10 can be prevented from tying of short (or long) bales, which can create problems with stacking, transporting, and retailing of such bales. The independent operation of the knotter assemblies 90 will be described in further detail below.

In operation, the baler 10 described above may be configured to simultaneously produce multiple bales of crop material from a single windrow. The number of bales that may be simultaneously formed by the baler 10 is at least partly dependent on the number of baling chambers 18 included in the baler 10. As discussed above, the baler 10 may include a plurality of baling chambers 18. The embodiments shown in the drawings illustrate the baler 10 including two, inline baling chambers 18. However, it should be understood that certain embodiments of the baler 10 may include more than two baling chambers 18 (e.g., three, four, five, six, or more). In general, the baler 10 will be equipped with a number of stuffer chutes 28, stuffer assemblies 50, plungers 52, and knotter assemblies 90 that corresponds with and/or that is equal to the number of baling chambers 18. As such, the baler 10 will be configured to adequately provide crop material to each of the baling chambers 18 to create the bales of crop material.

The following example illustrates a baler 10 with a pair of baling chambers 18, which can be used to simultaneously form multiple square bales of crop material. As the baler 10 is pulled along its path of travel by the tow vehicle, the pickup mechanism 22 can pick up crop material from a single windrow of crop material. Particularly, the plurality of tines extending from the rotating member of the pickup mechanism 22 functions to pick up the crop material from the ground and to force the crop material upwardly and rearwardly to the rotor housing 24, with such flow of crop material illustrated by the arrows of FIGS. 4 and 5. From the rotor housing 24, the separation element 44 and the rotor 26 (e.g., due to the specific configurations of the auger flightings and/or toothed sections) are configured to separate the crop material into multiple streams for provisioning to the stuffer chutes 28. In the exemplary embodiment, the baler 10 may include two stuffer chutes 28, such that the separation element 44 and the rotor 26 are configured to separate the crop material into two generally equal streams of crop material and to provide one stream to each of the respective stuffer chutes 28 (e.g., the left-side and the right-side stuffer chutes 28).

Figure 4:
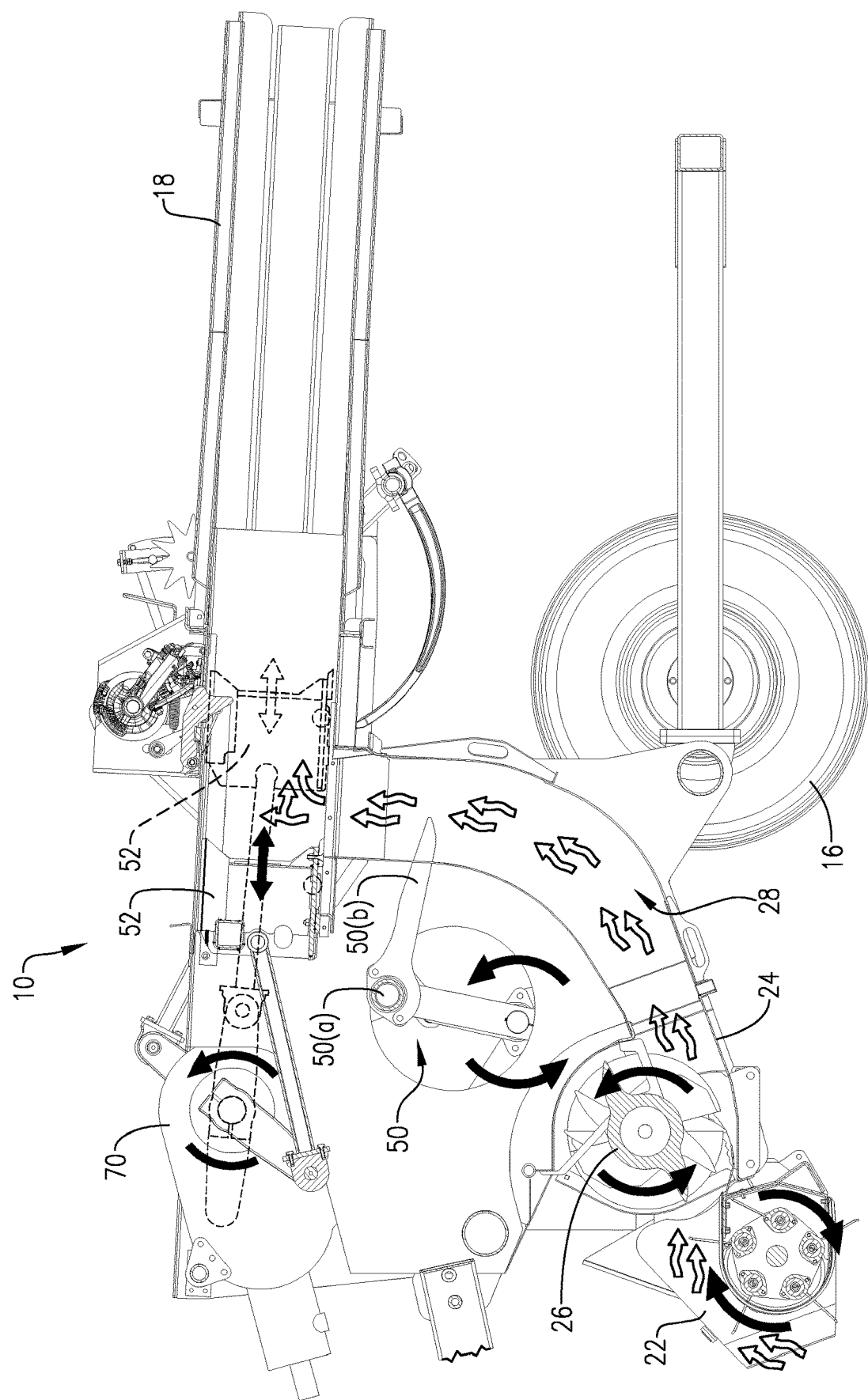
FIG. 4 is a cross-section of the baler from FIGS. 1-3, taken along the line 4-4 from FIG. 3, and provided with arrows to illustrate crop material flow through the baler.

While the crop material is in the stuffer chutes 28, the stuffer assemblies 50 of the stuffer chutes 28 will function to propel the crop material rearward and upward from the lower entrances of the stuffer chutes 28 to the upper exits of the stuffer chutes 28, as illustrated in FIG. 4. As the crop material is propelled rearward and upward, the crop material will also be pre-compressed due to the restricting size of the stuffer chutes 28. Upon the crop material reaching the upper exits of the stuffer chutes 28, the stuffer assemblies 50 will force charges of the crop material into the baling chambers 18. As was previously described, the two stuffer assemblies 50 may be offset by one-hundred and eighty degrees and may both be driven by the gearbox 70, such that the rotation of the stuffer assembles 50 are synchronized with the plungers 52 (which are also driven by the gearbox 70).

As such, in the embodiment of the baler 10 illustrated in the drawings (i.e., with two stuffer chutes 28, two stuffer assemblies 50, two baling chambers 18, and two plungers 52), the left-side stuffer assembly 50 can be rotated upward, due to actuation caused by the gearbox 70, so as to force a charge of crop material from into the crop inlet of the left-side baling chamber 18 (with the crop inlet being positioned on a bottom/forward side of the left-side baling chamber 18) while the left-side plunger 52 is in a retracted position. In such a configuration, the right-side stuffer assembly 50 will be in a lowered position and the right-side plunger 52 will be in an extended position. With a charge of crop material being added into the left-side baling chamber 18, the gearbox 70 can actuate the left-side plunger 52 to the extended position to compress the charge of crop material into flake of a bale of crop material. Such extension of the left-side plunger 52 will be accompanied, due to actuation caused by the gearbox 70, by a shifting of the right-side plunger 52 from the extended position to the retracted position. Simultaneously, the right-side stuffer assembly 50 can be rotated upward, due to actuation caused by the gearbox 70, so as to force a charge of crop material into the crop inlet of the right-side baling chamber 18 (with the crop inlet being positioned on a bottom/forward side of the right-side baling chamber 18) while the right-side plunger 52 is in a retracted position. With a charge of crop material being added into the right-side baling chamber 18, the gearbox 70 can actuate the right-side plunger 52 and can be extended to compress the charge of crop material into flake of a bale of crop material. Such actions can be repeated in a cyclical manner, as driven by the gearbox 70, so as to simultaneously form square bales of crop material in each of the left-side and right-side baling chambers 18.

As the bales are moving through each of the baling chambers 18 (e.g., the left-side and right-side baling chambers), the knotter assemblies 90 are configured to wrap and tie securement lines securely around the bales so as to hold the flakes of the bales together. Specifically, a left-side knotter assembly 90 may use its pair of knotting mechanisms 92 to wrap a pair of securement lines around the bales of crop material passing rearward through the left-side baling chamber 18. Upon the bale reaching the predetermined length, the trip mechanism 96 of the left-side knotter assembly 90 may cause the pair of needles 94 and the pair of knotting mechanisms 92 of the left-side knotter assembly 90 to actuate to complete the wrapping of the securement lines around the bale passing rearward through the left-side baling chamber 18 and to tie off the securement lines securely onto the bale. Similarly, a right-side knotter assembly 90 may use its pair of knotting mechanisms 92 to wrap a pair of securement lines around the bales of crop material passing rearward through the right-side baling chamber 18. Upon the bale reaching the predetermined length, the trip mechanism 96 of the right-side knotter assembly 90 may cause the pair of needles 94 and the pair of knotting mechanisms 92 of the right-side knotter assembly 90 to actuate to complete the wrapping of the securement lines around the bale passing rearward through the right-side baling chamber 18 and to tie off the securement lines securely onto the bale.

As was noted previously, the left-side and right-side knotter assemblies 90 may operate independently and at different times. To facilitate such independence, certain embodiments provide for the gearbox 70 to independently provide rotational power to each of the knotter assemblies 90. For example, in some embodiments, the auxiliary drive shaft 84 extending from the lift-side of the gearbox 70 may be connected (e.g., via chain and sprocket) to the sprocket 105 of the clutch mechanism 104 of the left-side knotter assembly 90. The sprocket 105 can, thus, be constantly driven by the auxiliary drive shaft 84 of the gearbox 70, such that the rotatable shaft 93 of the left-side knotter assembly 90 can be actuated (in addition to the needles 94 of the left-side knotter assembly 90) when engaged by the clutch mechanism 104 upon command from the measuring assembly 100 of the left-side knotter assembly 90. Certain embodiments may provide for the right-side knotter assembly 90 to be driven in a similar manner by a second auxiliary drive shaft (not shown) extending from a right-side of the gearbox 70, such that the left-side and right-side knotter assemblies 90 may operate independently and at different times.

Alternatively, as illustrated in FIGS. 1, 2 and 11, each of the left-side and right-side knotter assemblies 90 may be independently driven by the auxiliary drive shaft 84 extending from the lift-side of the gearbox 70. Specifically, the auxiliary drive shaft 84 may be connected (e.g., via chain and sprockets) with the drive input assembly 86 so as to provide rotational power to the stuffer assemblies 50. In some embodiments, the drive input assembly 86 may include an additional sprocket for connecting (e.g., via a chain) with the sprocket 105 of the clutch mechanism 104 of the left-side knotter assembly 90, so as to provide rotational power to the left-side knotter assembly 90. In addition, the rotational power provided to the stuffer assemblies 50 via the drive input assembly 86 will cause a corresponding rotation of the drive output assembly 88 on the right-side of the baler 10. The drive output assembly 88 may be connected (e.g., via chain and sprocket) with the sprocket 105 of the clutch mechanism 104 of the right-side knotter assembly 90, so as to provide rotational power to the right-side knotter assembly 90. Thus, both the left-side and right-side knotter assemblies 90 may be driven by the auxiliary drive shaft 84 extending from the lift-side of the gearbox 70. Nevertheless, the left-side and right-side knotter assemblies 90 may operate independently and at different times based on the independent operation of their respective trip mechanisms 96.

Upon the bales of crop material being completely formed and tied off with securement lines, the bales may be ejected from ejection ports of the baling chambers 18. In some embodiments, the bales from each of the left-side and right-side baling chambers 18 will be ejected from the bale discharges of their respective baling chambers 18 in an alternating fashion. For example, due to the cyclical, reciprocating action of the left-side and right-side plungers 52, bales of crop material formed in the left-side baling chamber 18 may be completed in an alternating time periods with respect to bales formed in the right-side baling chamber 18. As such, the bales of crop material formed in the left-side and the right-side baling chambers 18 may be ejected in an alternating fashion. In different embodiments, the bales of crop material formed in the left-side baling chamber 18 may be ejected generally simultaneously as bales formed in the right-side baling chambers 18.

Although the invention has been described with reference to the one or more embodiments illustrated in the figures, it is understood that equivalents may be employed and substitutions made herein without departing from the scope of the invention as recited in the claims. For example, the baler 10 illustrated and described above may be considered an "in-line" square baler, wherein the pickup mechanism 22, the stuffer chutes 28, the plungers 52, and the baling chambers 18 are orientated and/or aligned generally along fore-and-aft direction. However, the principles of the present invention may be equally applicable to various other square and rectangular baler designs. For example, it is contemplated that embodiments of the present invention may utilize a pickup mechanism 22 that is offset from (e.g., to one side of) the baling chambers 18.

What is claimed is:

1. A high capacity square baler configured to pick up crop material from a single windrow and form a plurality of square bales from the crop material, said baler comprising:
    one or more stuffer chutes each configured to receive at least a portion of the crop material picked up by said baler;
    one or more stuffer assemblies each configured to push crop material upward through said one or more stuffer chutes;
    a plurality of bale-forming chambers, including a first bale-forming chamber and a second bale-forming chamber, each configured to receive crop material from said one or more stuffer chutes, wherein said first and second bale-forming chambers are spaced apart from each other, wherein said bale-forming chambers are configured to receive crop material from said one or more stuffer chutes through bottom portions of said bale-forming chambers; and
    a plurality of knotter assemblies, including a first knotter assembly and a second knotter assembly,
    wherein said first knotter assembly is associated with said first bale-forming chamber and is configured to wrap and tie at least two securement lines around bales formed in said first bale-forming chamber,
    wherein said second knotter assembly is associated with said second bale-forming chamber and is configured to wrap and tie at least two securement lines around bales formed in said second bale-forming chamber,
    wherein said first knotter assembly includes a first trip mechanism configured to initiate tying of said securement lines by said first knotter assembly around the bales formed in said first bale-forming chamber upon the bales being completely formed within said first bale-forming chamber, wherein said first trip mechanism comprises a first bale measuring assembly configured to determine sizes of bales formed within said first bale-forming chamber,
    wherein said second knotter assembly includes a second trip mechanism configured to initiate tying by said second knotter assembly of said securement lines around the bales formed in said second bale-forming chamber upon the bales being completely formed within said second bale-forming chamber, wherein said second trip mechanism comprises a second bale measuring assembly configured to determine sizes of bales formed within said second bale-forming chamber,
    wherein said first and second knotter assemblies are configured to operate independently of one another, such that bales formed in said first bale-forming chamber can be tied at different times than bales formed in said second bale-forming chamber.

2. The baler of claim 1, wherein said baler has an inline configuration.

3. The baler of claim 1, wherein said first and second bale-forming chambers are positioned side-by-side.

4. The baler of claim 1, wherein said securement lines comprise twine.

5. The baler of claim 1, wherein each knotter assembly further comprises at least two knotting mechanisms and at least two needles, wherein said knotting mechanisms and said needles are configured to be cooperatively actuated to tie said securement lines around the bales.

6. The baler of claim 5, wherein said trip mechanism of each knotter assembly is configured to measure a length of a formed bale and to initiate tying of said securement lines around each bale upon completion of bale formation.

7. The baler of claim 6, wherein said trip mechanism of each knotter assembly is configured to operate independently of each other.

8. The baler of claim 5, wherein each measuring assembly comprises an electronic measuring assembly for measuring the length of the bales formed in the bale-forming chamber with which said measuring assembly is associated, wherein said electronic measuring assembly includes a rotary encoder configured to provide bale length data to an electronic control unit.

9. The baler of claim 1, further comprising a rotating power source for providing rotational power to said knotter assemblies.

10. The baler of claim 9, wherein the rotating power source comprises a gearbox, wherein said gearbox is configured to receive rotating power from a power take-off of a tow vehicle.

11. The baler of claim 9, wherein said baler is configured to provide rotating power from the rotating power source independently to each of said knotter assemblies.

12. The baler of claim 9, wherein said stuffer assemblies include a drive input assembly, wherein said rotating power source includes one or more drive shafts configured to provide rotational power to said stuffer assemblies via the drive input of said stuffer assemblies.

13. The baler of claim 12, wherein said first and second knotter assemblies are configured to receive rotational power from the said one or more stuffer assemblies.

14. The baler of claim 13, wherein said first and second knotter assemblies each comprises at least two knotting mechanisms and at least two needles, wherein said first and second knotter assemblies each further includes clutch mechanisms for selectively applying rotational power to actuate said knotting mechanisms and said needles.

15. The baler of claim 1, wherein said first and second bale-forming chambers are capable of releasing bales at different times, with such bales being completely formed and tied with the securement lines.

16. A method of forming a plurality of bales of crop material with a high capacity square baler, said method comprising the steps of:
- (a) picking up crop material from a single windrow;
- (b) providing the crop material to one or more stuffer chutes, wherein the stuffer chutes are configured to pre-compress the crop material;
- (c) transferring the crop material from the stuffer chutes to a first bale-forming chamber and a second bale-forming chamber, wherein said first and second bale-forming chambers are spaced apart from each other, wherein crop material is transferred through bottom portions of said first and second bale-forming chambers;
- (d) forming bales of crop material within each of the first bale-forming chamber and the second bale-forming chamber;
- (e) measuring bale sizes of the bales formed in the first bale-forming chamber via a first trip mechanism associated with the first bale-forming chamber;
- (f) measuring bale sizes of the bales formed in the second bale-forming chamber via a second trip mechanism associated with the second bale-forming chamber;
- (g) tying, via a first knotter assembly, at least two securement lines around the bales formed in the first bale-forming chamber;
- (h) tying, via a second knotter assembly, at least two securement lines around the bales formed in the second bale-forming chamber,
- wherein the first and second knotter assemblies are configured to operate independently of one another, such that said tying of steps (g) and (h) can be performed at different times.

17. The method of claim 16, wherein said measuring of steps (e) and (f) include measuring a length of each bale passing through each of the first bale-forming chamber and the second bale-forming chamber.

18. The method of claim 17, wherein the first and second trip mechanisms include an electronic measuring assembly for measuring the length of the bales, wherein the electronic measuring assembly includes a rotary encoder configured to provide bale length data to an electronic control unit.

19. The method of claim 16, wherein said tying of steps (g) and (h) includes providing rotary power independently to each of the first and second knotter assemblies.

* * * * *